US008096173B2

(12) United States Patent
Isono

(10) Patent No.: US 8,096,173 B2
(45) Date of Patent: Jan. 17, 2012

(54) TIRE ACTION FORCE DETECTING DEVICE

(75) Inventor: Hiroshi Isono, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 114 days.

(21) Appl. No.: 12/531,706

(22) PCT Filed: Apr. 25, 2008

(86) PCT No.: PCT/JP2008/058445
§ 371 (c)(1),
(2), (4) Date: Sep. 17, 2009

(87) PCT Pub. No.: WO2008/133353
PCT Pub. Date: Nov. 6, 2008

(65) Prior Publication Data
US 2010/0071453 A1    Mar. 25, 2010

(30) Foreign Application Priority Data

Apr. 25, 2007  (JP) .................................. 2007-115413

(51) Int. Cl.
*G01M 17/02* (2006.01)
(52) U.S. Cl. ........................................................ 73/146
(58) Field of Classification Search .................. None
See application file for complete search history.

(56) References Cited

U.S. PATENT DOCUMENTS

| | | | |
|---|---|---|---|
| 4,023,404 A * | 5/1977 | Brendel | ................... 73/862.042 |
| 4,297,877 A | 11/1981 | Stahl | |
| 5,313,828 A | 5/1994 | Koetzle et al. | |
| 2001/0020386 A1 * | 9/2001 | Mancosu et al. | ................. 73/146 |
| 2002/0014114 A1 * | 2/2002 | Mancosu et al. | ................. 73/146 |
| 2003/0056579 A1 * | 3/2003 | Poulbot et al. | .................. 73/146 |
| 2005/0188756 A1 | 9/2005 | Morikawa | |

FOREIGN PATENT DOCUMENTS

| | | |
|---|---|---|
| EP | 1 749 720 A1 | 2/2007 |
| JP | 6 41898 | 6/1994 |
| JP | 2003 14563 | 1/2003 |
| JP | 2003 246201 | 9/2003 |
| JP | 2004 142577 | 5/2004 |
| JP | 2005 249517 | 9/2005 |
| JP | 2005 274492 | 10/2005 |

* cited by examiner

*Primary Examiner* — Andre Allen
(74) *Attorney, Agent, or Firm* — Oblon, Spivak, McClelland, Maier & Neustadt, L.L.P.

(57) ABSTRACT

An apparatus to accurately detect a force acting on a tire, based on a stress acting on a connection mechanism that connects a wheel and a wheel support member. A tire-acting-force detection apparatus is applied to a vehicle including a wheel unit composed of a wheel and a tire held at an outer circumferential portion of the wheel; a wheel support member which supports the wheel by a wheel support portion perpendicular to a rotation axis such that the wheel can rotate about the rotation axis; and a connection mechanism which connects a circular plate portion of the wheel and a wheel support portion of the wheel support member at a plurality of positions separated from one another about the rotation axis. The tire-acting-force detection apparatus includes a plurality of detection elements detecting stresses acting on each bolt, and an electronic circuit apparatus calculating a tire acting force, which acts at the ground contact point of the tire, based on the detected stresses.

28 Claims, 23 Drawing Sheets

TIRE ACTION FORCE DETECTING DEVICE

TECHNICAL FIELD

The present invention relates to a detection apparatus for a vehicle such as an automobile, and more particularly to a tire-acting-force detection apparatus for detecting force acting on a tire of a wheel unit.

BACKGROUND ART

Conventionally, there have been proposed various types of tire-acting-force detection apparatuses for detecting force acting on a tire of a wheel unit in a vehicle such as an automobile. For example, Japanese Patent Application Laid-Open (kokai) Nos. 2003-14563, 2005-249517, and 2005-274492 disclose tire-acting-force detection apparatuses previously proposed by the applicant of the present application. Each of the disclosed tire-acting-force detection apparatuses is interposed between a wheel which holds a tire at a peripheral portion thereof and a holing member which holds the wheel such that the wheel can rotate about a rotation axis, and is configured to indirectly detect forces acting between the wheel and the holding member, to thereby detect force acting on the tire.

The proposed tire-acting-force detection apparatus can detect force acting on the tire on the basis of force acting between the wheel and the holding member. However, in a tire-acting-force detection apparatus of such a type, a wheel-side member fixedly connected to the wheel and a holding-member-side member fixedly connected to the holding member are indispensable. Further, the tire-acting-force detection apparatus of such a type requires a member which allows the wheel-side member and the holding-member-side member to move relative to each other when a force acts between the wheel and the holding member due to a force acting on the tire, or a member which transmits stress between the wheel-side member and the holding-member-side member. Moreover, a detector must detect the relative displacement between the wheel-side member and the holding-member-side member or the stress transmitted therebetween. Accordingly, the above-described conventional tire-acting-force detection apparatuses have problems of complicated structure and high cost.

In general, in a vehicle such as an automobile, in order to allow maintenance work such as replacement of the tire, the wheel is fixedly connected to the holding member by means of (generally, four) connection means each including a connection element such as a bolt. Accordingly, when a force from a road surface acts on the wheel via the tire, the greater portion of the force is transmitted to the holding member via the connection means. A stress transmitted to the holding member via the connection means corresponds to the force acting on the tire. Accordingly, the force acting on the tire can be estimated from the stress acting on each connection means without interposing a complicated tire-acting-force detection apparatus between the wheel and the holding member.

DISCLOSURE OF THE INVENTION

The present inventor has accomplished the present invention while directing his attention to the possibility of estimating the force acting on the tire from the stress acting on each connection means. A main object of the present invention is to accurately detect a force acting on a tire, by use of a simpler structure as compared with conventional apparatuses, by means of detecting a stress acting on each connection means and calculating the force acting on the tire on the basis of the stress.

The present invention provides a tire-acting-force detection apparatus for a vehicle which includes a wheel unit composed of a wheel having a circular plate portion perpendicular to a rotation axis and a tire held at an outer circumferential portion of the wheel; a wheel support member which is supported by a vehicle body for rotation about the rotation axis and which supports the wheel for rotation about the rotation axis by a wheel support portion thereof extending perpendicularly to the rotation axis; and at least one connection means for connecting the circular plate portion of the wheel and the wheel support portion of the wheel support member. The tire-acting-force detection apparatus is adapted to estimate a tire acting force, which is a force acting at a ground contact point of the tire. The tire-acting-force detection apparatus comprises at least one stress detection means for detecting a stress acting on the corresponding connection means; and calculation means for calculating the tire acting force on the basis of the detected stress.

According to this configuration, a stress acting on the connection means, which connects the circular plate portion of the wheel and the wheel support portion of the wheel support member, is detected, and the tire acting force is calculated on the basis of the detected stress. Therefore, the tire acting force can be calculated on the basis of the stress transmitted between the wheel and the wheel support member via the connection means, and, thus, the tire acting force can be detected accurately by use of a simpler structure as compared with the conventional tire-acting-force detection apparatus as described above.

The above-described configuration may be such that each connection means has a center axis parallel to the rotation axis; and each stress detection means detects a stress acting on the corresponding connection means at a plurality of positions about the center axis.

According to this configuration, each connection means has a center axis parallel to the rotation axis; and each stress detection means detects a stress acting on the connection means at a plurality of positions about the center axis. Therefore, the stress acting on the connection means can be obtained accurately, whereby the tire acting force can be obtained accurately on the basis of the stress acting on the connection means.

In the above-described configuration, the stress detection means may be configured to detect, at a plurality of positions about the center axis of the corresponding connection means, a stress in a direction parallel to the center axis.

According to this configuration, the stress detection means detects, at a plurality of positions about the center axis of the connection means, a stress in a direction parallel to the center axis. Therefore, a stress in the rotational direction of the wheel unit, a stress in the lateral direction of the wheel unit, and a stress in the vertical direction of the wheel unit, which act on each connection means, can be obtained accurately.

In the above-described configuration, the stress detection means may be configured to detect, at a plurality of positions about the center axis of the corresponding connection means, a stress in a direction passing through the center axis and perpendicular to the center axis.

According to this configuration, each stress detection means detects, at a plurality of positions about the center axis of the corresponding connection means, a stress in a direction passing through the center axis and perpendicular to the center axis. Therefore, a stress in the rotational direction of the wheel unit and a stress in the radial direction of the wheel unit, which act on each connection means, can be obtained accurately.

The above-described configuration may be such that a plurality of connection means are disposed around the rotation axis to be separated from one another; and the stress detection means is configured to detect a stress acting on each of the plurality of connection means.

According to this configuration, a stress acting in the front-rear direction of the tire at the ground contact point of the tire, a stress acting in the lateral direction of the tire at the ground contact point of the tire, or a stress acting in the vertical direction of the tire at the ground contact point of the tire can be calculated as the tire acting force on the basis of the stress acting on each of the plurality of connection means.

In the above-described configuration, the calculation means may be configured to calculate at least one of the stress acting in the front-rear direction of the tire at the ground contact point of the tire, the stress acting in the lateral direction of the tire at the ground contact point of the tire, and the stress acting in the vertical direction of the tire at the ground contact point of the tire, on the basis of at least one of a stress acting in the rotational direction of the wheel unit at the position of the center axis of each connection means, a stress acting in the lateral direction of the wheel unit at the position of the center axis of each connection means, and a stress acting in the vertical direction of the wheel unit at the position of the center axis of each connection means, the stresses being presumed to act at the position of the center axis of each connection means on the basis of stresses at a plurality of positions about the center axis.

According to this configuration, at least one of the stress acting in the front-rear direction of the tire at the ground contact point of the tire, the stress acting in the lateral direction of the tire at the ground contact point of the tire, and the stress acting in the vertical direction of the tire at the ground contact point of the tire can be calculated as the tire acting force.

The above-described configuration may be such that a plurality of connection means are disposed around the rotation axis to be separated from one another; and the stress detection means is configured to detect stresses acting on two connection means whose angular interval therebetween about the rotation axis is closest to 180°.

Since stresses in the vertical direction of the wheel unit which act on the two connection means whose angular interval therebetween about the rotation axis is closest to 180° act in opposite directions and cancel out each other, this configuration can reduce the influence of the stress acting in the vertical direction of the tire. Therefore, the stress acting in the front-rear direction of the tire at the ground contact point of the tire can be calculated as the tire acting force on the basis of the stresses acting on the two connection means whose angular interval therebetween about the rotation axis is closest to 180°.

In the above-described configuration, the calculation means may be configured to calculate the stress acting in the front-rear direction of the tire at the ground contact point of the tire on the basis of stresses which are presumed, on the basis of stresses at a plurality of positions about the center axis of each connection means, to act in the rotational direction of the wheel unit at the positions of the center axes of the two connection means.

For example, through calculation of the sum of the stresses presumed to act in the rotational direction of the wheel unit at the positions of the center axes of the two connection means, the influence of the stresses in the vertical direction of the wheel unit which act on the two connection means can be cancelled out. Therefore, the above-described configuration enables calculating the stress acting in the front-rear direction of the tire at the ground contact point of the tire while effectively eliminating the influence of the stresses in the vertical direction of the wheel unit.

The above-described configuration may be such that a plurality of connection means are disposed around the rotation axis to be separated from one another; and the stress detection means is configured to detect stresses acting on two connection means whose angular interval therebetween about the rotation axis is closest to 90°.

According to this configuration, since the stresses acting on two connection means whose angular interval therebetween about the rotation axis is closest to 90° are detected, the stress acting in the vertical direction of the tire at the ground contact point of the tire can be calculated on the basis of these stresses.

In the above-described configuration, the calculation means may be configured to calculate the stress acting in the vertical direction of the tire at the ground contact point of the tire on the basis of stresses which are presumed, on the basis of stresses at a plurality of positions about the center axis of each of two connection means, to act in the vertical direction of the wheel unit at the positions of the center axes of the two connection means.

According to this configuration, the stress acting in the vertical direction of the tire can be calculated as a value which is proportional to the resultant of the stresses presumed to act in the vertical direction of the wheel unit at the positions of the center axes of the two connection means.

The above-described configuration may be such that a plurality of connection means are disposed around the rotation axis to be separated from one another; and the stress detection means is configured to detect a stresses acting on one connection means.

According to this configuration, the stress acting in the front-rear direction of the tire at the ground contact point of the tire and the stress acting in the vertical direction of the tire at the ground contact point of the tire can be calculated as the tire acting force, on the basis of the stress acting on one of the plurality of connection means disposed around the rotation axis to be separated from one another.

In the above-described configuration, the calculation means may be configured to calculate the stress acting in the front-rear direction of the tire at the ground contact point of the tire or the stress acting in the vertical direction of the tire at the ground contact point of the tire, on the basis of a stress acting in the rotational direction of the wheel unit at the position of the center axis of one connection means and a stress acting in the vertical direction of the wheel unit at the position of the center axis of the connection means, the stresses being presumed to act at the position of the center axis of the connection means on the basis of stresses at a plurality of positions about the center axis.

According to this configuration, the stress acting in the front-rear direction of the tire at the ground contact point of the tire or the stress acting in the vertical direction of the tire at the ground contact point of the tire can be calculated by merely detecting the stress acting on one connection means.

In the above-described configuration, the tire-acting-force detection apparatus may comprise a disk member which is interposed between the circular plate portion of the wheel and the wheel support member and functions as a wheel support portion, wherein the disk member is fixed to the wheel support member and is connected to the circular plate portion of the wheel by a plurality of connection means.

According to this configuration, the tire-acting-force detection apparatus comprises a disk member which is interposed between the circular plate portion of the wheel and the wheel support member and functions as a wheel support portion; and the disk member is fixed to the wheel support member and is connected to the circular plate portion of the wheel by a plurality of connection means. Therefore, it is possible to accurately detect the tire acting force without requiring a great alteration of the structure of the wheel support member such as a hub member.

In the above-described configuration, each connection means may include a holding portion provided on the wheel support portion, and a connection element which is cantilevered at one end portion by the holding portion, is fixedly connected at the other end portion to the circular plate portion, and extends parallel to the rotation axis, wherein each stress detection means includes strain detection means for detecting a strain of the connection element caused by an elastic deformation thereof.

According to this configuration, each connection means includes a holding portion provided on the wheel support portion, and a connection element which is cantilevered at one end portion by the holding portion, is fixedly connected at the other end portion to the circular plate portion, and extends parallel to the rotation axis, wherein each stress detection means includes strain detection means for detecting a strain of the connection element caused by an elastic deformation thereof. Therefore, the stress transferred from the wheel to the wheel support member via the connection means can be detected accurately as a strain of the connection element caused by an elastic deformation thereof.

In the above-described configuration, each connection means may include a holding portion provided on the wheel support portion, and a connection element which is cantilevered at one end portion by the holding portion, is fixedly connected at the other end portion to the circular plate portion, and extends parallel to the rotation axis, wherein each stress detection means includes strain detection means for detecting a strain of the holding portion caused by an elastic deformation thereof.

According to this configuration, each connection means includes a holding portion provided on the wheel support portion, and a connection element which is cantilevered at one end portion by the holding portion, is fixedly connected at the other end portion to the circular plate portion, and extends parallel to the rotation axis, wherein each stress detection means includes strain detection means for detecting a strain of the holding portion caused by an elastic deformation thereof. Therefore, the stress transferred from the wheel to the wheel support member via the connection means can be detected accurately as a strain of the holding portion caused by an elastic deformation thereof.

In the above-described configuration, each connection means may include a holding portion provided on the wheel support portion, and a connection element which is cantilevered at one end portion by the holding portion, is fixedly connected at the other end portion to the circular plate portion, and extends parallel to the rotation axis, wherein each stress detection means includes displacement amount detection means for detecting an amount of relative displacement of the connection element in relation to the holding portion caused by an elastic deformation of the connection element.

According to this configuration, each connection means includes a holding portion provided on the wheel support portion, and a connection element which is cantilevered at one end portion by the holding portion, is fixedly connected at the other end portion to the circular plate portion, and extends parallel to the rotation axis, wherein each stress detection means includes displacement amount detection means for detecting an amount of relative displacement of the connection element in relation to the holding portion caused by an elastic deformation of the connection element. Therefore, the stress transferred from the wheel to the wheel support member via the connection means can be detected accurately as an amount of relative displacement of the connection element in relation to the holding portion caused by an elastic deformation of the connection element.

In the above-described configuration, each connection means may include a holding portion provided on the wheel support portion, and a connection element which is cantilevered at one end portion by the holding portion, is fixedly connected at the other end portion to the circular plate portion, and extends parallel to the rotation axis, wherein each stress detection means includes surface pressure detection means for detecting a surface pressure between the connection element and the wheel support portion.

According to this configuration, each connection means includes a holding portion provided on the wheel support portion, and a connection element which is cantilevered at one end portion by the holding portion, is fixedly connected at the other end portion to the circular plate portion, and extends parallel to the rotation axis, wherein each stress detection means includes surface pressure detection means for detecting a surface pressure between the connection element and the wheel support portion. Therefore, the stress transferred from the wheel to the wheel support member via the connection means can be detected accurately as a surface pressure between the connection element and the wheel support portion.

In the above-described configuration, each surface pressure detection means may be configured to detect a surface pressure in a direction perpendicular to the center axis between the connection element and the wheel support portion.

According to this configuration, since each stress detection means detects a surface pressure in a direction perpendicular to the center axis between the connection element and the wheel support portion, the stress in the rotational direction of the wheel unit and the stress in the vertical direction of the wheel unit which act on each connection means can be obtained accurately as a surface pressure in the direction perpendicular to the center axis, whereby the stress acting in the front-rear direction of the tire at the ground contact point of the tire and the stress acting in the vertical direction of the tire at the ground contact point of the tire can be accurately calculated on the basis of these stresses.

In the above-described configuration, each surface pressure detection means may include a detection element disposed between the connection element and the wheel support portion, and adjustment means for adjusting a surface pressure which acts on the detection element in a state where no extra stress acts on the tire by adjusting a clearance between the connection element and the wheel support portion in a direction perpendicular to the center axis.

According to this configuration, the surface pressure which acts on the detection means in a state where no extra stress acts on the tire can be adjusted through adjustment of the clearance between the connection element and the wheel support portion in the direction perpendicular to the center axis. Thus, the stress transferred from the wheel to the wheel support member via the connection means can be detected accurately as a surface pressure between the connection element and the wheel support portion.

In the above-described configuration, each surface pressure detection means may be configured to detect a surface pressure in a direction along the center axis between the connection element and the circular plate portion of the wheel.

According to this configuration, since each stress detection means detects a surface pressure acting in a direction along the center axis between the connection element and the circular plate portion of the wheel, the stress in the lateral direction of the wheel unit which acts on each connection means can be obtained accurately as a surface pressure acting in a direction along the center axis, whereby the stress acting in the lateral direction of the tire at the ground contact point of the tire can be accurately calculated on the basis of these stresses.

The above-described configuration may include a detection element disposed between the connection element and the circular plate portion of the wheel; and a stress transfer means which is disposed between the connection element and the circular plate portion, is fitted onto the connection element, and transfers stress from the circular plate portion to the detection element along the center axis.

According to this configuration, there are provided a detection element disposed between the connection element and the circular plate portion of the wheel; and a stress transfer means which is disposed between the connection element and the circular plate portion, is fitted onto the connection element, and transfers stress from the circular plate portion to the detection element along the center axis. Therefore, stress can be reliably transferred from the wheel to the detection element via the stress transmission means. Thus, a stress which acts on the connection element along the center axis and expands and contracts the connection element along the center axis can be detected reliably and accurately.

In the above-described configuration, the one end portion of the connection element has a larger cross sectional area than that of the other end portion of the connection element.

According to this configuration, since one end portion of the connection element has a larger cross sectional area than that of the other end portion of the connection element, the portion supported by the wheel support portion can have a sufficient strength, whereby the durability of the tire-acting-force detection apparatus can be improved.

In the above-described configuration, the wheel support portion may include load limiting means which is fitted onto the connection element at a position separated from one end portion thereof toward the wheel unit side along the center axis, and limits elastic deformation of the connection element to thereby limit load acting on the connection element.

According to this configuration, load acting on the connection element can be limited by limiting elastic deformation of the connection element at a position separated from one end portion of the connection element toward the wheel unit side along the center axis. Therefore, it is possible to prevent an excessively large load from acting on the connection element.

In the above-described configuration, the load limiting means may be a portion of the wheel support portion.

According to this configuration, since the load limiting means may be a portion of the wheel support portion, as compared with the case where the load limiting means is a member independent of the wheel support portion, the number of components and cost of the tire-acting-force detection apparatus can be reduced, and assembly of the tire-acting-force detection apparatus can be simplified.

In the above-described configuration, an elastic seal ring annularly extending around the center axis may be disposed between the connection element and a portion of the wheel support portion, wherein the elastic seal ring prevents a foreign substance from reaching the stress detection means.

According to this configuration, an elastic seal ring annularly extending around the center axis may be disposed between the connection element and a portion of the wheel support portion, and the elastic seal ring prevents a foreign substance from reaching the stress detection means. Therefore, it is possible to effectively reduce stress detection errors and prevent possible failure of the tire-acting-force detection apparatus, which errors and failure would otherwise occur when a foreign substance reaches the stress detection means.

The above-described configuration may be such that the load limiting means extends annularly around the connection element between the connection element and the wheel support portion; and first and second seal rings each annularly extending around the center axis are disposed between the connection element and the load limiting means and between the load limiting means and the wheel support portion, respectively, wherein the first and second elastic seal rings prevent a foreign substance from reaching the stress detection means.

According to this configuration, first and second seal rings each annularly extending around the center axis are disposed between the connection element and the load limiting means and between the load limiting means and the wheel support portion, respectively; and the first and second elastic seal rings prevent a foreign substance from reaching the stress detection means. Therefore, it is possible to effectively reduce stress detection errors and prevent possible failure of the tire-acting-force detection apparatus, which errors and failure would otherwise occur when a foreign substance reaches the stress detection means. Further, rattling of the load liming means in a direction perpendicular to the center axis can be prevented.

In the above-described configuration, at least a portion of the connection element may assume a tubular shape, wherein the stress detection means detects a strain of the tubular-shaped portion of the connection element.

According to this configuration, the stress detection means detects a strain of the tubular-shaped portion of the connection element. Since the tubular-shaped portion has a higher ratio of the amount of elastic deformation to the stress acting on the connection element than does the solid portion, the S/N ratio of detection of the stress acting on the connection element can be made higher than that in the case where the stress detection means detects strain of the solid portion of the connection member, whereby the S/N ratio of detection of the tire acting force can be increased.

In the above-described configuration, at least a portion of the holding portion may assume a tubular shape, wherein the stress detection means detects a strain of the tubular-shaped portion of the holding portion.

According to this configuration, the stress detection means detects a strain of the tubular-shaped portion of the holding portion. Since the tubular-shaped portion has a higher ratio of the amount of elastic deformation to the stress acting on the holding portion than does the solid portion, the S/N ratio of detection of the stress acting on the connection element can be made higher than that in the case where the stress detection means detects strain of the solid portion of the holding portion, whereby the S/N ratio of detection of the tire acting force can be increased.

In the above-described structure, the stress detection means may be configured to detect at least one of the stress acting on the corresponding connection means in the rotational direction of the wheel unit, the stress acting on the corresponding connection means in the lateral direction of the wheel unit, and the stress acting on the corresponding connection means in the radial direction of the wheel unit.

In the above-described structure, the stress detection means may be configured to detect the stress acting on the corresponding connection means in the rotational direction of the wheel unit, the stress acting on the corresponding connection means in the lateral direction of the wheel unit, and the stress acting on the corresponding connection means in the radial direction of the wheel unit.

In the above-described structure, the calculation means may be configured to calculate the stress acting in the front-rear direction of the tire on the basis of the stress acting in the rotational direction of the wheel unit.

In the above-described structure, the calculation means may be configured to calculate the stress acting in the front-rear direction of the tire on the basis of the sum of the stress acting on each connection means in the rotational direction of the wheel unit.

In the above-described structure, the calculation means may be configured to calculate the stress acting in the lateral direction of the tire on the basis of the stress acting on each connection means in the lateral direction of the wheel unit.

In the above-described structure, the calculation means may be configured to calculate the stress acting in the lateral direction of the tire on the basis of the sum of the stress acting on each connection means in the lateral direction of the wheel unit.

In the above-described structure, the calculation means may be configured to calculate the stress acting on each connection means in the vertical direction of the wheel unit on the basis of the stress acting on each connection means in the rotational direction of the wheel unit and the stress acting on each connection means in the radial direction of the wheel unit.

In the above-described structure, the calculation means may be configured to calculate the stress acting on each connection means in the vertical direction of the wheel unit as the square root of sum of squares of the stress which acts on each connection means in the rotational direction of the wheel unit and from which rotational torque of the wheel unit has been eliminated, and the stress which acts on each connection means in the radial direction of the wheel unit.

In the above-described structure, the calculation means may be configured to calculate the stress acting in the vertical direction of the tire on the basis of the sum of the stress acting on each connection means in the vertical direction of the wheel unit.

In the above-described structure, the plurality of positions about the center axis may be four positions composed of two positions located on opposite sides of the center axis with respect to a radial direction of the wheel unit, and two positions located on opposite sides of the center axis with respect to a direction perpendicular to the radial direction of the wheel unit.

In the above-described configuration, the calculation means may be configured to calculate the stress acting in the front-rear direction of the tire at the ground contact point of the tire, the stress acting in the lateral direction of the tire at the ground contact point of the tire, and the stress acting in the vertical direction of the tire at the ground contact point of the tire, on the basis of a stress acting in the rotational direction of the wheel unit at the position of the center axis of each connection means, a stress acting in the lateral direction of the wheel unit at the position of the center axis of each connection means, and a stress acting in the vertical direction of the wheel unit at the position of the center axis of each connection means, the stresses being presumed to act at the position of the center axis of each connection means on the basis of stresses at a plurality of positions about the center axis.

In the above-described configuration, the disk member may be configured to support at least a portion of the calculation means.

In the above-described configuration, the strain detection means may be configured to detect a strain in a direction along the center axis caused by an elastic deformation of the connection element.

In the above-described configuration, the displacement amount detection means may be configured to detect the amount of relative displacement of the connection element in relation to the holding portion in a direction perpendicular to the center axis of the connection element caused by an elastic deformation of the connection element.

In the above-described configuration, the stress transmission means may be fitted onto the connection element at a position separated from one end portion of the connection element toward the wheel unit side along the center axis so as to limit elastic deformation of the connection element, to thereby function as a load limiting means for limiting load acting on the connection element.

In the above-described configuration in which the stress detection means is configured to detect stresses acting on two connection means whose angular interval therebetween about the rotation axis is closest to 180°, the stress detection means may be configured to detect stresses acting on the corresponding connection means at positions separated from one another in the circumferential direction of the wheel unit.

In the above-described configuration in which the stress detection means is configured to detect stresses acting on two connection means whose angular interval therebetween about the rotation axis is closest to 180°, the calculation means may be configured to calculate the stress acting in the front-rear direction of the tire at the ground contact point of the tire on the basis of stresses which are presumed, on the basis of the sum of stresses at a plurality of positions about the center axis of each connection means, to act in the rotational direction of the wheel unit at the positions of the center axes of the two connection means.

In the above-described configuration in which the stress detection means is configured to detect stresses acting on two connection means whose angular interval therebetween about the rotation axis is closest to 90°, the stress detection means may be configured to detect stresses acting on the corresponding connection means at positions separated from each other in the radial direction of the wheel unit.

In the above-described configuration in which the stress detection means is configured to detect stresses acting on two connection means whose angular interval therebetween about the rotation axis is closest to 90°, the calculation means may be configured to calculate the stress acting in the vertical direction of the tire at the ground contact point of the tire on the basis of the square root of sum of squares of stresses which are presumed, on the basis of stresses at a plurality of positions about the center axes of two connection means, to act in the vertical direction of the wheel unit at the positions of the center axes of the two connection means.

In the above-described configuration in which the stress detection means detects a stress acting on one connection means, the calculation means may be configured to calculate a stress acting in the rotational direction of the wheel unit at the center axis of the one connection means and a stress acting in the vertical direction of the wheel unit at the center axis of the one connection means, and calculate the stress acting in the front-rear direction of the tire at the ground contact point of the tire on the basis of the sum of the stress acting in the rotational direction of the wheel unit when the direction of the stress acting in the vertical direction of the wheel unit changes from upward to downward and the stress acting in the rotational direction of the wheel unit when the direction of the stress acting in the vertical direction of the wheel unit changes from downward to upward.

In the above-described configuration in which the stress detection means detects a stress acting on one connection means, the calculation means may be configured to calculate a stress acting in the rotational direction of the wheel unit at the center axis of the one connection means and a stress acting in the vertical direction of the wheel unit at the center axis of the one connection means, and calculate the stress acting in the vertical direction of the tire at the ground contact point of the tire on the basis of the difference between the stress acting in the rotational direction of the wheel unit when the direction of the stress acting in the vertical direction of the wheel unit changes from upward to downward and the stress acting in the rotational direction of the wheel unit when the direction of the stress acting in the vertical direction of the wheel unit changes from downward to upward.

BEST MODE FOR CARRYING OUT THE INVENTION

Several preferred embodiments of the present invention will now be described in detail with reference to the accompanying drawings.

First Embodiment

Figure 1:
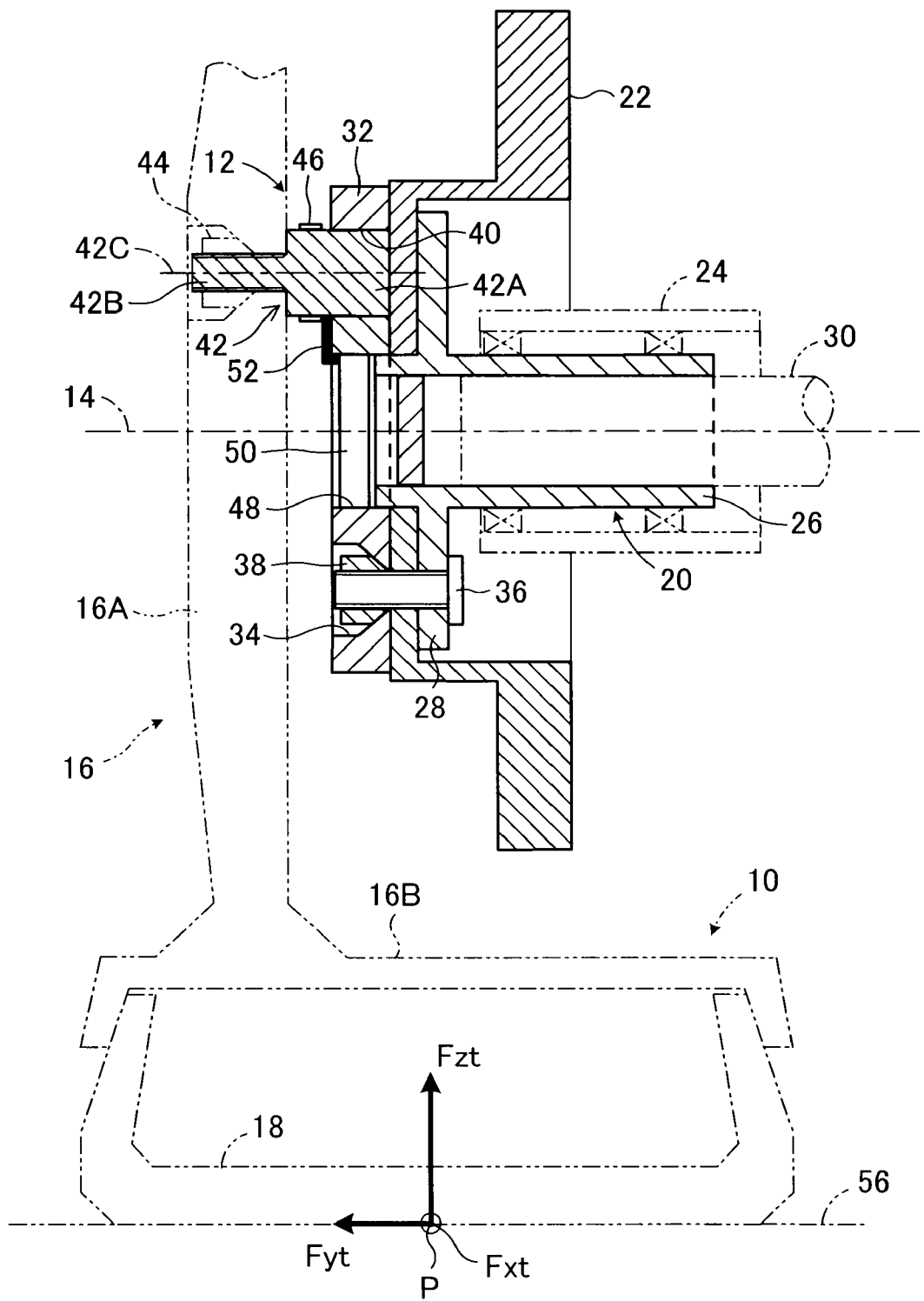
FIG. 1 is a cross sectional view of a first embodiment of a tire-acting-force detection apparatus according to the present invention applied to a drive wheel unit, taken along a cutting plane (I-I of FIG. 2) passing through the rotation axis of the wheel unit.
Figure 2:
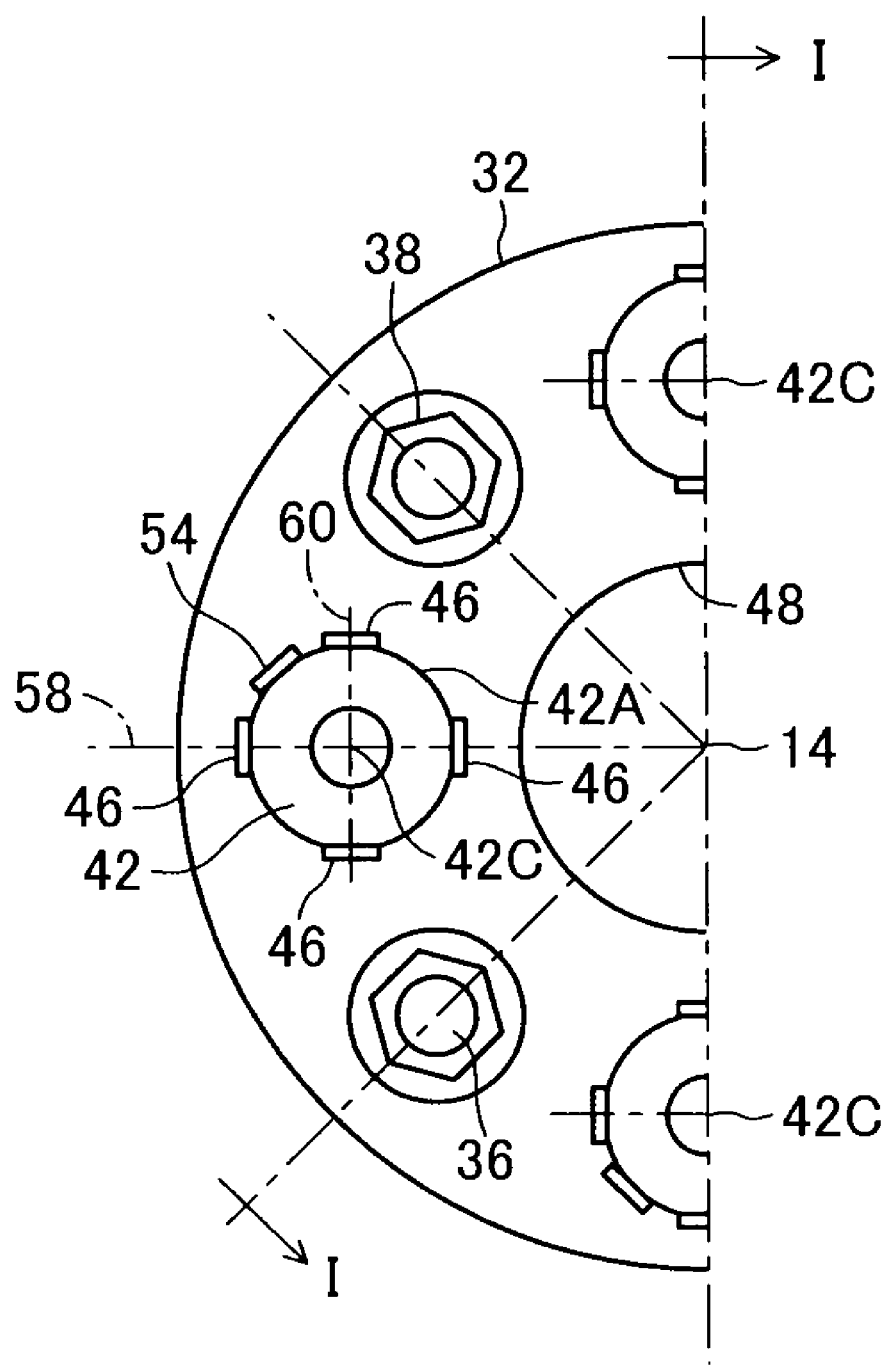
FIG. 2 is a half front view of a main portion of the first embodiment as viewed from the outboard side of a vehicle.

FIG. 1 is a cross sectional view of a first embodiment of a tire-acting-force detection apparatus according to the present invention applied to a drive wheel unit, taken along a cutting plane (I-I of FIG. 2) passing through the rotation axis of the wheel unit. FIG. 2 is a half front view of a main portion of the first embodiment as viewed from the outboard side of a vehicle.

In FIG. 1, reference numeral 10 denotes a wheel unit of an unillustrated vehicle, and 12 denotes a tire-acting-force detection apparatus. The wheel unit 10 includes a wheel 16, which is formed of metal and which has a circular plate portion 16A perpendicular to a rotation axis 14, and a tire 18, which is mainly formed of rubber and which is held on a rim portion 16B provided along the outer periphery of the wheel 16. The wheel unit 10 is supported by a hub member 20 such that the wheel unit 10 can rotate about the rotation axis 14. The tire-acting-force detection apparatus 12, together with a brake rotor disk 22, is disposed between the wheel unit 10 and the hub member 20.

The hub member 20 has a tubular shaft portion 26 supported by a bearing 24 to be rotatable about the rotation axis 14, and a flange portion 28 integrated with the shaft portion and extending perpendicular to the rotation axis 14. Although not illustrated in FIG. 1, the bearing 24 is supported by a vehicle body via a suspension member. The wheel unit 10 is a drive wheel unit, and a drive shaft 30 is inserted into the shaft portion 26 from the side opposite the wheel unit 10. The drive shaft 30, which extends along the rotation axis 14 and is rotatable about the rotation axis 14, is firmly connected to the shaft portion 26 by means of press fitting or the like. Notably, the wheel unit to which the tire-acting-force detection apparatus of the present invention is applied may be a follower wheel unit.

A disk member 32 assuming the form of a circular plate is disposed coaxially with the rotation axis 14 between the circular plate portion 16A and the flange portion 28, and the disk member 32 extends perpendicular to the rotation axis 14. Four holes 34 are formed in the disk member 32 at intervals of 90° about the rotation axis 14, and extend parallel to the rotation axis 14. A bolt 36 is inserted into each hole 34. The bolt 36 penetrates the flange portion 28 of the hub member 20 and the brake rotor disk 22, and a head portion of the bolt 36 is in contact with an inside surface of the flange portion 28. The disk member 32 is firmly and integrally fixed to the flange portion 28 and the brake rotor disk 22 by means of the bolt 36 and a nut 38 screw-engaged with the bolt 36.

Four holes 40 are provided in the disk member 32 at positions about the rotation axis 14 offset from the holes 34 by 45° such that the holes 40 extend parallel to the rotation axis 14. A root portion 42A of a bolt 42, which serves as a connection element, is fixed to each hole 40 by means of press fitting. Each bolt 42 has a small diameter thread portion 42B located on the outboard side of the disk member 32. A center axis 42C of each bolt 42 extends parallel to the rotation axis 14. The thread portion 42B extends through the circular plate portion 16A of the wheel 16, and integrally connected to the circular plate portion 16A by mean of a nut 44 screw-engaged with the distal end of the thread portion 42B.

Thus, the hub member 20 and the disk member 32 cooperatively function as a wheel support member which has a wheel support portion extending perpendicular to the rotation axis 14. The disk member 32, the bolt 42, and the nut 44 cooperatively function as four connection means which connect the circular plate portion 16A of the wheel 16 to the wheel support portion of the wheel support member at four positions equally separated from one another about the rotation axis 14. Each bolt 42 is supported at the root portion 42A by the disk member 32 in a cantilevered fashion.

In the first embodiment, the length of the root portion 42A of the bolt 42 along the center axis 42C is set greater than the thickness of the disk member 32, and the root portion 42A partially projects from the disk member 32 on the side toward the wheel unit 10. Accordingly, the circular plate portion 16A of the wheel 16 is in contact with an end surface of the root portion 42A located on the side toward the thread portion 42B in a state where the circular plate portion 16A is separated from the disk member 32 along the rotation axis 14. Four detection elements 46 are fixed to a cylindrical surface of the root portion 42A of each bolt 42 located between the circular plate portion 16A and the disk member 32.

Each detection element 46 is composed of, for example, a resistance wire strain gauge, and functions as stress detection means which outputs a current signal whose magnitude corresponds to an elastic strain of the root portion 42A of the bolt 42 along the center axis 42C, to thereby enable detection of a stress acting along the center axis 42C on the surface of the root portion 42A. The disk member 32 has a hole 48 aligned with the rotation axis 14. An outboard end of the shaft portion 26 of the hub member 20 is partially fitted into the hole 48, and an electronic circuit apparatus 50, which functions as calculation means, is disposed in the hole 48. The current signal output from each detection element 46 is fed to the electronic circuit apparatus 50 via a lead wire 52. Further, a temperature sensor 54 is provided on the surface of each bolt 42, and a signal representing a temperature T detected by the temperature sensor 54 is also fed to the electronic circuit apparatus 50.

As will be described later, on the basis of the current signal fed from each detection element 46 and the temperature signal fed from the temperature sensor 54, the electronic circuit apparatus 50 calculates a stress (front-rear force) Fxt in a front-rear direction perpendicular to the rotation axis 14, a stress (lateral force) Fyt in a lateral direction parallel to the rotation axis 14, and a stress (vertical force) Fzt in a vertical direction perpendicular to the rotation axis 14, which act from a road surface 56 to the tire 18 at the center P of a ground contract surface of the tire 18. The electronic circuit apparatus 50 outputs, to an unillustrated control apparatus of the vehicle, signals representing the respective stresses.

As shown in FIG. 2, for each bolt 42, the detection element 46 is provided at each of two intersections between the circumference of the root portion 42A and a radial straight line 58 passing through the rotation axis 14 and the corresponding center axis 42C and two intersections between the circumference of the root portion 42A and a straight line 60 passing through the center axis 42C and perpendicularly intersecting the straight line 58. In other words, one pair of the detection elements 46 facing each other with the center axis 42C located therebetween are separated from each other in the radial direction of the disk member 32; i.e., the radial direction of the wheel unit 10, and the other pair of the detection elements 46 are separated 90° around the center line 42C from the one pair of the detection element 46.

Figure 3:
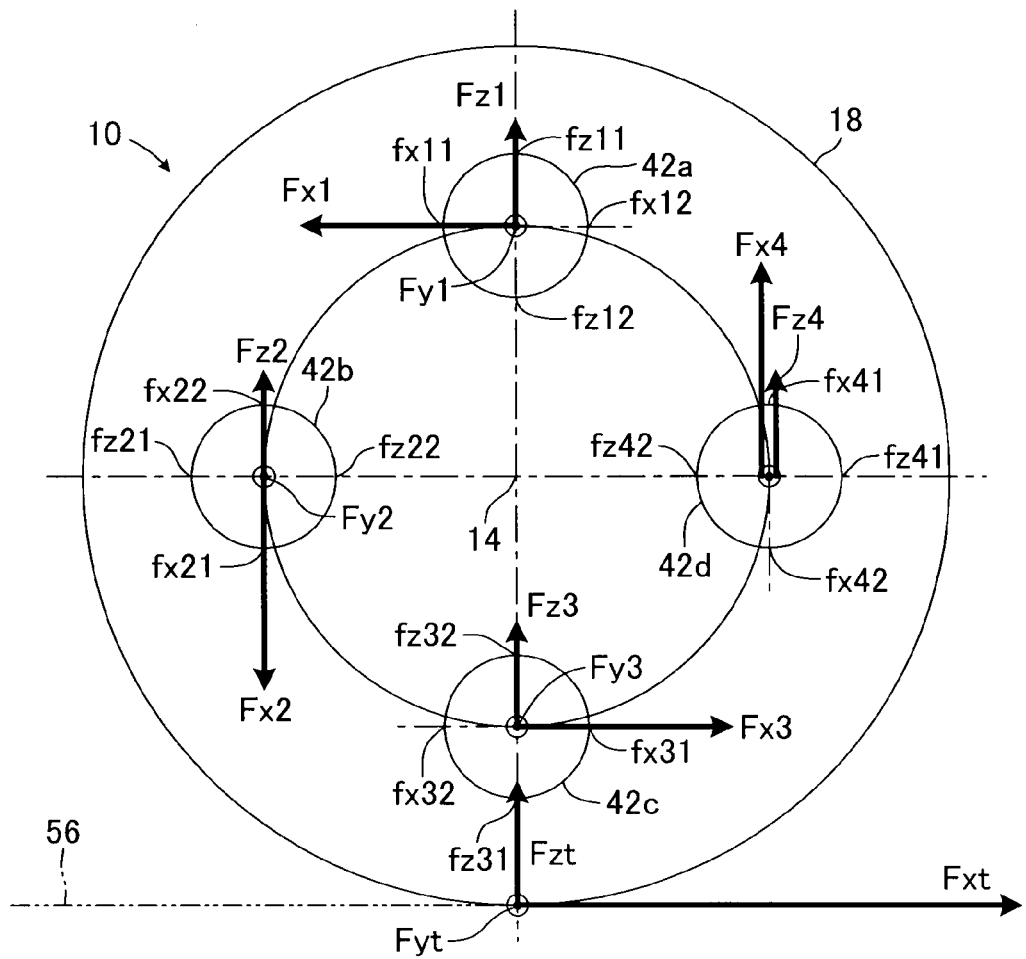
FIG. 3 is an explanatory view showing stresses detected by detection elements in the first embodiment, as viewed from the outboard side of the wheel unit.

FIG. 3 is an explanatory view showing stresses detected by the detection elements 46 in the first embodiment, as viewed from the outboard side of the wheel unit 10. As shown in FIG. 3, the four bolts 42 are denoted by 42$a$ to 42$d$. Stresses which are to be detected by the detection elements 46 located on the outer sides of the bolts 42$a$ to 42$d$ with respect to the radial direction of the wheel unit 10 are represented by fz11, fz21, fz31, and fz41, respectively; and corresponding stresses detected by these detection elements 46 (hereinafter referred to as the "detected stresses of the detection elements 46") are represented by fiz11, fiz21, fiz31, and fiz41, respectively. Similarly, stresses which are to be detected by the detection elements 46 located on the inner sides of the bolts 42$a$ to 42$d$ with respect to the radial direction of the wheel unit 10 are represented by fz12, fz22, fz32, and fz42, respectively; and the detected stresses of these detection elements 46 are represented by fiz12, fiz22, fiz32, and fiz42, respectively.

Further, stresses which are to be detected by the detection elements 46 located at positions separated 90° counterclockwise from the detection elements 46 located on the outer sides of the bolts 42a to 42d with respect to the radial direction of the wheel unit 10 are represented by fx11, fx21, fx31, and fx41, respectively; and the detected stresses of these detection elements 46 are represented by fix11, fix21, fix31, and fix41, respectively. Similarly, stresses which are to be detected by the detection elements 46 located at positions separated 90° counterclockwise from the detection elements 46 located on the inner sides of the bolts 42a to 42d with respect to the radial direction of the wheel unit 10 are represented by fx12, fx22, fx32, and fx42, respectively; and the detected stresses of these detection elements 46 are represented by fix12, fix22, fix32, and fix42, respectively.

Figure 4:
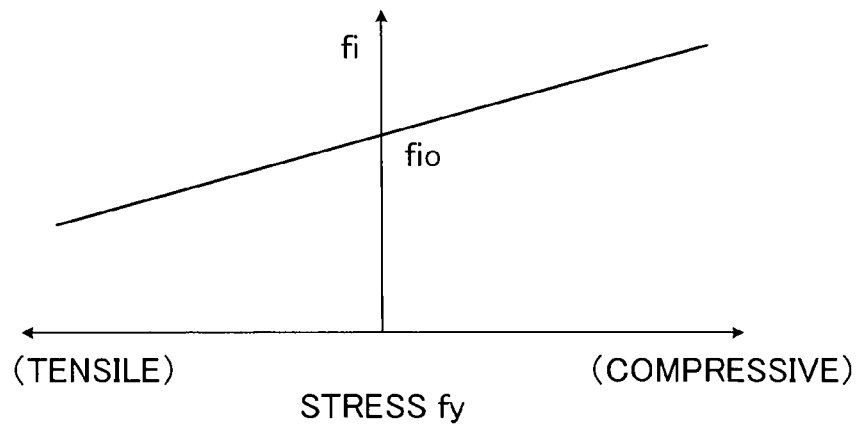
FIG. 4 is a graph showing the relation between stress fy acing on each bolt along a center axis thereof and stress fi detected by each detection element.

FIG. 4 is a graph showing the relation between stress fy acting on the outer circumferential portion of each bolt 42a-42d along the center axis 42C and detected stress fi of each detection element. As shown in FIG. 4, each detection element 46 is adjusted such that the detected stress fi coincides with a standard detected stress fio (positive constant) when the stress fy does not act on the bolt 42a-42d. Further, when the stress fy is tensile stress, the detected stress fi of each detection element 46 decreases from the standard detected stress fio in proportion to the magnitude of the stress fy; and, when the stress Fy is compressive stress, the detected stress fi of each detection element 46 increases from the standard detected stress fio in proportion to the magnitude of the stress fy.

Notably, each detection element 46 has a known temperature characteristic. When the temperatures of the bolts 42a-42d detected by the temperature sensors 54 are represented by T1-T4, the temperature-dependent variations of the detected stresses fi of the detection elements 46 of the bolts 42a to 42d are represented by functions fi1(T1)-fi4(T4) of the temperatures T1-T4.

Accordingly, stresses fx*1, fx*2, fz*1, and fz*2 (where * represents 1 to 4) are represented by the following Eqs. 1 to 4.

$$fx*1 = fix*1 - fio - fi*(T*) \quad (1)$$

$$fx*2 = fix*2 - fio - fi*(T*) \quad (2)$$

$$fz*1 = fiz*1 - fio - fi*(T*) \quad (3)$$

$$fz*2 = fiz*2 - fio - fi*(T*) \quad (4)$$

Figure 5:
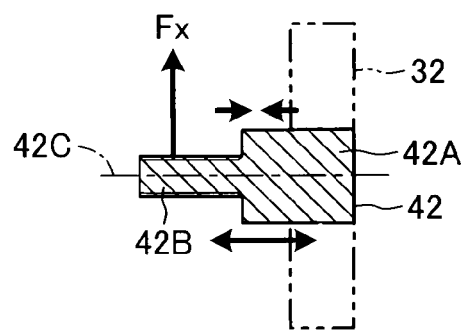
FIG. 5 is an explanatory view showing a stress which acts on the surface of a root portion of a bolt along the center axis thereof when a stress Fx in the rotational direction of the wheel unit acts on a thread portion of the bolt.

FIG. 5 is an explanatory view showing a stress which acts on the surface of the root portion 42A of the bolt 42 along the center axis 42C thereof when a stress Fx in the rotational direction of the wheel unit 10 acts on the thread portion 42B of the bolt 42. As shown in FIG. 5, a compressive stress acts on the outer circumferential portion of the root portion 42A on one side of the center axis 42C toward which the stress Fx acts, and a tensile stress acts on the outer circumferential portion of the root portion 42A on the other side of the center axis 42C opposite the side toward which the stress Fx acts. Accordingly, the stress Fx acting on each bolt 42 in the rotational direction of the wheel unit 10 is proportional to the difference between the stress fx11, fx21, fx31, fx41—which is to be detected by the detection element 46 located at a position separated 90° counterclockwise from the detection element 46 located on the outer side of the bolt 42 with respect to the radial direction of the wheel unit 10—and the stress fx12, fx22, fx32, fx42—which is to be detected by the detection element 46 located at a position separated 90° counterclockwise from the detection element 46 located on the inner side of the bolt 42 with respect to the radial direction of the wheel unit 10.

Therefore, as shown in FIG. 3, stresses Fx1-Fx4 which act at the centers of the bolts 42a-42d in the rotational direction of the wheel unit 10 are represented by the following Eqs. 5 to 8, where kx is a proportional constant (positive constant).

$$Fx1 = kx(fx11 - fx12) \quad (5)$$
$$= kx(fix11 - fix12)$$

$$Fx2 = kx(fx21 - fx22) \quad (6)$$
$$= kx(fix21 - fix22)$$

$$Fx3 = kx(fx31 - fx32) \quad (7)$$
$$= kx(fix31 - fix32)$$

$$Fx4 = kx(fx41 - fx42) \quad (8)$$
$$= kx(fix41 - fix42)$$

The front-rear force Fxt acting from the road surface 56 to the tire 18 at the center P of the ground contact surface of the tire 18 is represented by the following Eq. 9, where Ax is a coefficient (positive constant) determined from the radius of rotation of the wheel unit 10, the distance between the rotation axis 14 and the center axis 42C, etc.

$$Fxt = Ax(Fx1+Fx2+Fx3+Fx4) \quad (9)$$

Further, since the stresses Fy1-Fy4 acting at the centers of the bolts 42a-42d along the respective center axes 42C are proportional to the sum of the stresses fx*1+fx*2+fz*1+fz*2, the stresses Fy1-Fy4 are represented by the following Eqs. 10 to 13, where ky is a proportional constant.

$$Fy1 = ky(fx11 + fx12 + fz11 + fz12) \quad (10)$$
$$= ky\{fix11 + fix12 + fiz11 + fiz12 - 4(fio + fi1(T1))\}$$

$$Fy2 = ky(fx21 + fx22 + fz21 + fz22) \quad (11)$$
$$= ky\{fix21 + fix22 + fiz21 + fiz22 - 4(fio + fi2(T2))\}$$

$$Fy3 = ky(fx31 + fx32 + fz31 + fz32) \quad (12)$$
$$= ky\{fix31 + fix32 + fiz31 + fiz32 - 4(fio + fi3(T3))\}$$

$$Fy4 = ky(fx41 + fx42 + fz41 + fz42) \quad (13)$$
$$= ky\{fix41 + fix42 + fiz41 + fiz42 - 4(fio + fi4(T4))\}$$

The lateral force Fyt acting from the road surface 56 to the tire 18 at the center P of the ground contact surface of the tire 18 is represented by the following Eq. 14, where Ay is a coefficient (positive constant) determined from the radius of rotation of the wheel unit 10, the distance between the rotation axis 14 and the center axis 42C, etc.

$$Fyt = Ay(Fy1+Fy2+Fy3+Fy4) \quad (14)$$

Figure 6:
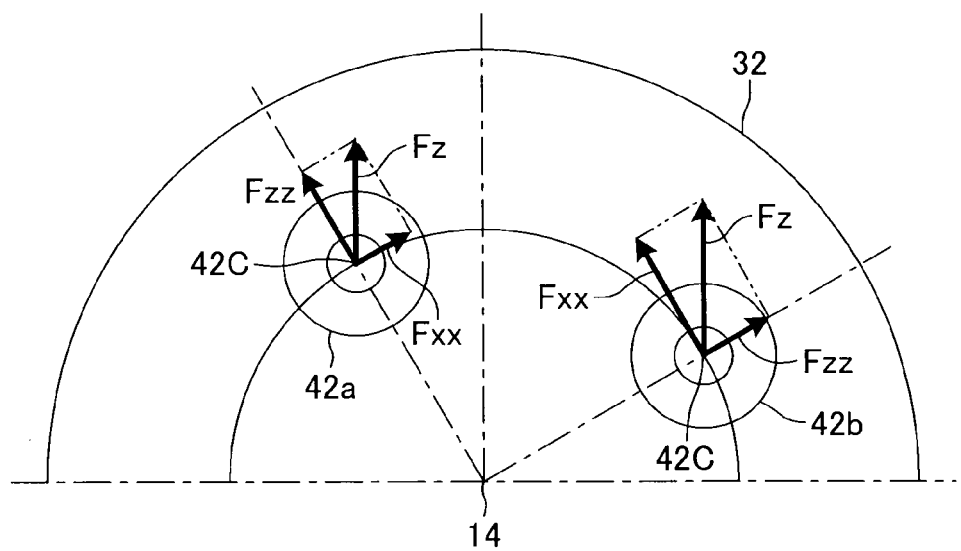
FIG. 6 is an explanatory view showing the relation among a stress Fzz in the radial direction, a stress Fxx in the rotational direction, and a stress Fz in the vertical direction, which act on the bolt at the center axis thereof.

FIG. 6 is an explanatory view showing the relation among stresses acting on each of the bolts 42a and 42b; i.e., a stress Fzz in the radial direction which acts at the center axis 42C, a stress Fxx in the rotational direction which acts at the center axis 42C with rotational torque (Fxt/4Ax) eliminated therefrom, and a stress Fz in the vertical direction which acts at the center axis 42C. As can be understood from FIG. 6, irrespective of the position of the bolt about the rotation axis 14, the stress Fz in the vertical direction can be considered to be the resultant of the stress Fzz in the radial direction and the stress Fxx in the rotational direction with rotational torque eliminated therefrom.

Accordingly, stresses Fz1 to Fz4 acting on the bolt 42a-42d at the centers in the vertical direction are represented by the following Eqs. 15 to 18, wherein kz represents a proportional constant for the stresses fz*1-fz*2 in the radial direction.

$$Fz1 = \{(Fx1 - Fxt/4Ax)^2 + kz^2(fz11 - fz12)^2\}^{1/2}$$
$$= \{(Fx1 - Fxt/4Ax)^2 + kz^2(fiz11 - fiz12)^2\}^{1/2} \quad (15)$$

$$Fz2 = \{(Fx2 - Fxt/4Ax)^2 + kz^2(fz21 - fz22)^2\}^{1/2}$$
$$= \{(Fx2 - Fxt/4Ax)^2 + kz^2(fiz21 - fiz22)^2\}^{1/2} \quad (16)$$

$$Fz3 = \{(Fx3 - Fxt/4Ax)^2 + kz^2(fz31 - fz32)^2\}^{1/2}$$
$$= \{(Fx3 - Fxt/4Ax)^2 + kz^2(fiz31 - fiz32)^2\}^{1/2} \quad (17)$$

$$Fz4 = \{(Fx4 - Fxt/4Ax)^2 + kz^2(fz41 - fz42)^2\}^{1/2}$$
$$= \{(Fx4 - Fxt/4Ax)^2 + kz^2(fiz41 - fiz42)^2\}^{1/2} \quad (18)$$

The vertical force Fzt acting from the road surface 56 to the tire 18 at the center P of the ground contact surface of the tire 18 is represented by the following Eq. 19, where Az is a coefficient (positive constant) determined from the distances between the instantaneous center of vertical movement of the wheel unit 10, and the detection elements 46 and the center P of the ground contact surface of the tire 18.

$$Fzt = Az(Fz1 + Fz2 + Fz3 + Fz4) \quad (19)$$

As can be understood from the description above, on the basis of the current signals fed from the detection elements 46 and the temperature signal fed from the temperature sensor 54, the electronic circuit apparatus 50 calculates the front-rear force Fxt acting on the tire 18 in accordance with the above-described Eqs. 5 to 9, the lateral force Fyt acting on the tire 18 in accordance with the above-described Eqs. 10 to 14, and the vertical force Fzt acting on the tire 18 in accordance with the above-described Eqs. 5 to 9 and the above-described Eqs. 15 to 19.

Notably, since the stress Fx* in the rotational direction and the front-rear force Fxt are used for calculation of the vertical force Fzt, the front-rear force Fxt is calculated before calculation of the vertical force Fzt. However, the lateral force Fyt may be calculated before or after calculation of the front-rear force Fxt and the vertical force Fzt. Further, the front-rear force Fxt acting on the tire 18 may be calculated in accordance with an equation obtained by inserting the above-described Eqs. 5 to 8 into the above-described Eq. 9; the lateral force Fyt acting on the tire 18 may be calculated in accordance with an equation obtained by inserting the above-described Eqs. 10 to 13 into the above-described Eq. 14; and the vertical force Fzt acting on the tire 18 may be calculated in accordance with an equation obtained by inserting the above-described Eqs. 5 to 9 and the above-described Eqs. 15 to 18 into the above-described Eq. 19.

Thus, according to the illustrated first embodiment, the stresses Fx1-Fx4 in the rotational direction of the wheel unit 10, the stresses Fy1-Fy4 in the lateral direction of the wheel unit 10, and the stresses Fz1-Fz4 in the vertical direction, which act on each bolt 42 can be obtained on the basis of a strain of each bolt 42 caused by an elastic deformation thereof stemming from a stress acting from the wheel 16 onto the bolt 42, serving as a connection element. Further, the front-rear force Fxt, the lateral force Fyt, and the vertical force Fzt, which act from the road surface 56 to the tire 18, can be accurately calculated from these stresses.

Second Embodiment

Figure 7:
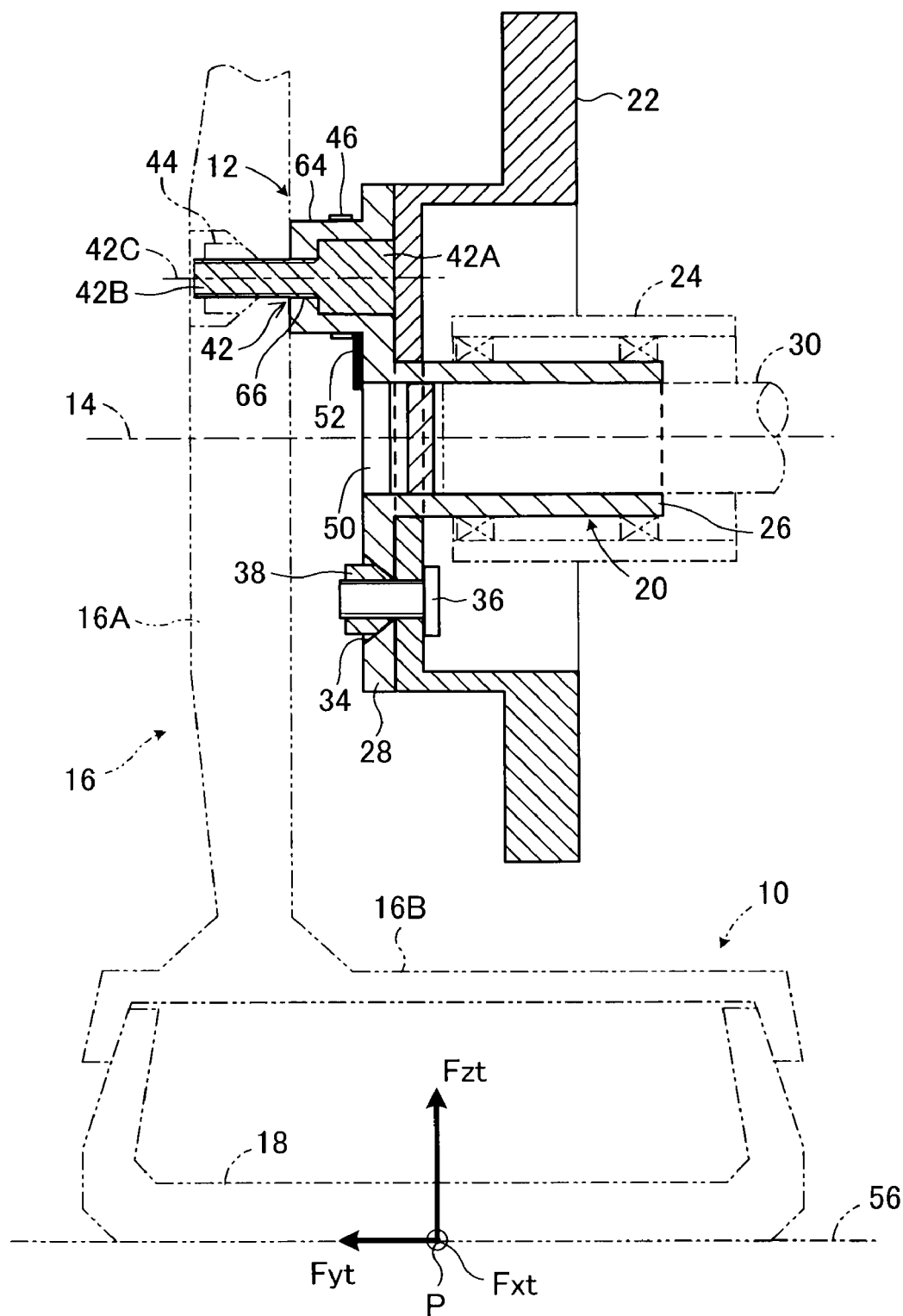
FIG. 7 is a cross sectional view of a second embodiment of the tire-acting-force detection apparatus according to the present invention applied to a drive wheel unit, taken along a cutting plane (VII-VII of FIG. 8) passing through the rotation axis of the wheel unit.
Figure 8:
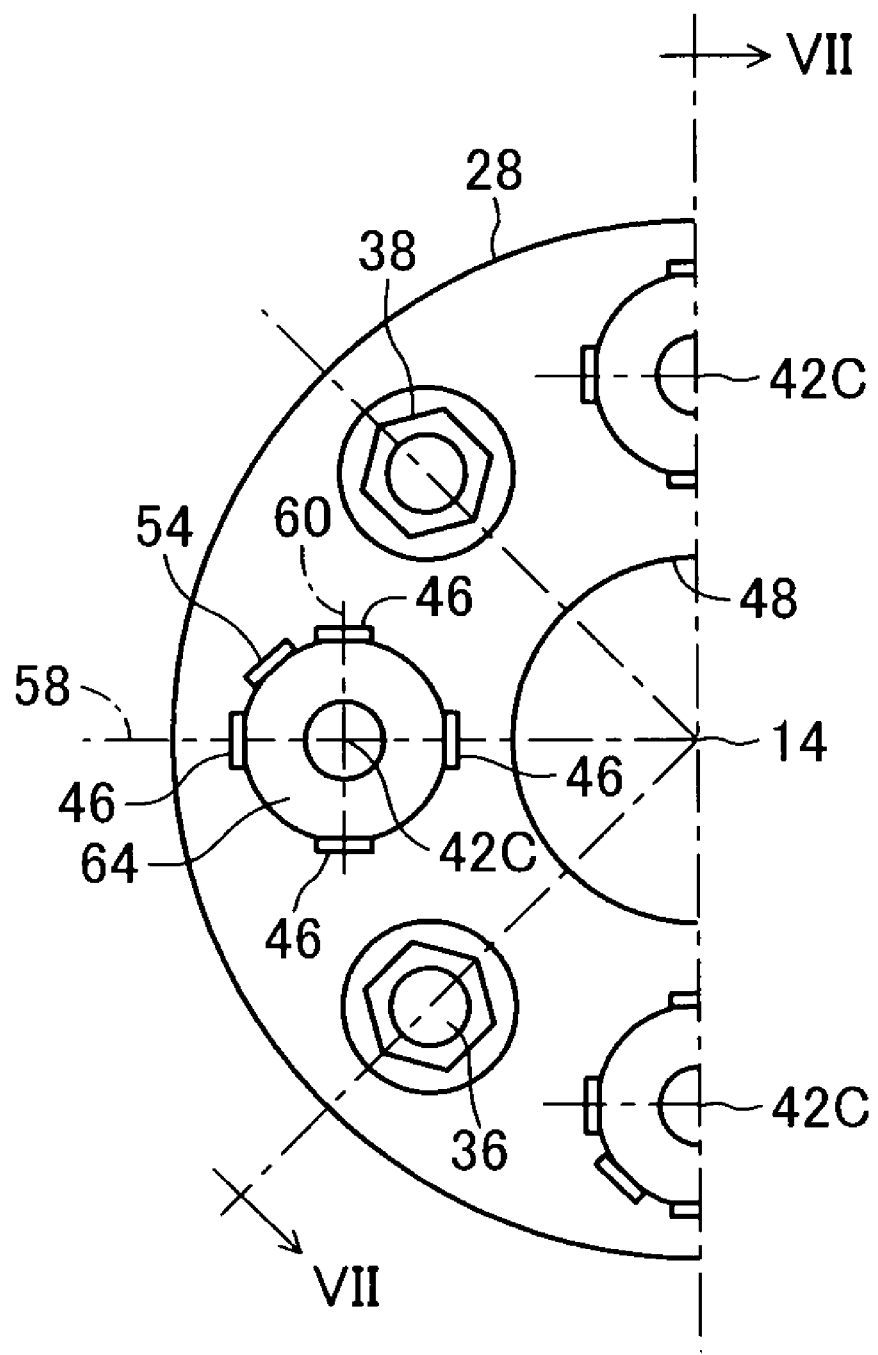
FIG. 8 is a half front view of a main portion of the second embodiment as viewed from the outboard side of the vehicle.

FIG. 7 is a cross sectional view of a second embodiment of the tire-acting-force detection apparatus according to the present invention applied to a drive wheel unit, taken along a cutting plane (VII-VII of FIG. 8) passing through the rotation axis of the wheel unit. FIG. 8 is a half front view of a main portion of the second embodiment as viewed from the outboard side of the vehicle. Notably, in FIGS. 7 and 8, members identical with those shown in FIGS. 1 and 2 are denoted by the same reference numerals as those used in FIGS. 1 and 2. This convention also applies to other embodiments to be described later.

In this second embodiment, a member corresponding to the disk member 32 used in the above-described first embodiment is not provided, and four bolt support portions 64 are provided on the flange portion 28 of the hub member 20 at positions separated 90° from one another around the rotation axis 14. Each bolt support portion 64 assumes a substantially cylindrical tubular form extending parallel to the rotation axis 14, and is integrally connected at one end with the flange portion 28.

Each bolt support portion 64 supports a bolt 42 having the same shape as the bolt 42 in the above-described first embodiment in a state in which the large diameter root portion 42A of the bolt 42 is closely fitted into the bolt support portion 64, and the small diameter thread portion 42B of the bolt 42 is in screw-engagement with a threaded hole 66 provided in the other end of the bolt support portion 64. Further, the thread portion 42B extends through the other end of the bolt support portion 64 and the circular plate portion 16A of the wheel 16, and is integrally connected to the circular plate portion 16A by means of a nut 44 screw-engaged with the distal end of the thread portion 42B.

Thus, the hub member 20 functions as a wheel support member, and the flange portion 28 functions as a wheel support portion extending perpendicular to the rotation axis 14. The bolt support portion 64, the bolt 42, and the nut 44 cooperatively function as four connection means which connect the circular plate portion 16A of the wheel 16 to the wheel support portion of the wheel support member at four positions equally separated from one another about the rotation axis 14. Each bolt 42 is supported at the root portion 42A by the corresponding bolt support portion 64 in a cantilevered fashion. The circular plate portion 16A of the wheel 16 is in contact with an end surface of the other end of the bolt support portion 64 in a state where the circular plate portion 16A is separated from the flange portion 28 along the rotation axis 14.

In this second embodiment, four detection elements 46 and one temperature sensor 54 are fixed to a cylindrical outer surface of each bolt support portion 64. The positional relations of the four detection elements 46 on each bolt support portion 64 with respect to the rotation axis 14 and the center axis 42C of the bolt 42 are the same as those in the above-described first embodiment. Further, the stress detection characteristic and temperature characteristic of the detection elements 46 are the same as those in the above-described first embodiment.

However, the standard detected stress fio of each detection element 46; i.e., detected stress fi at the time when the stress fy does not act on the outer circumferential portion of the bolt support portion 64 is calculated as the average of detected stresses fi of the paired detection elements 46 facing each other with the center axis 42C located therebetween. That is, the standard detected stress fioz*(*=1, 2, 3, 4) of the paired detection elements 46 facing each other along the radial direction of the wheel unit 10 is calculated in accordance with the following Eq. 20; and the standard detected stress fiox*(*=1, 2, 3, 4) of the paired detection elements 46 facing each other along a direction perpendicular to the radial direction of the wheel unit 10 is calculated in accordance with the following Eq. 21.

$$fioz^* = (fiz^*1 + fiz^*2)/2 \qquad (20)$$

$$fiox^* = (fix^*1 + fix^*2)/2 \qquad (21)$$

Figure 9:
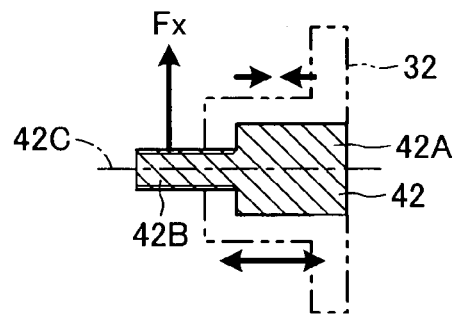
FIG. 9 is an explanatory view showing a stress which acts on the cylindrical outer surface of a bolt support portion along the center axis thereof when a stress Fx in the rotational direction of the wheel unit acts on a thread portion of the bolt.

FIG. 9 is an explanatory view showing a stress which acts on the cylindrical outer surface of the bolt support portion 64 along the center axis 42C thereof when a stress Fx in the rotational direction of the wheel unit 10 acts on the thread portion 42B of the bolt 42. As shown in FIG. 9, a compressive stress acts on the cylindrical outer surface of the bolt support portion 64 on one side of the center axis 42C toward which the stress Fx acts, and a tensile stress acts on the cylindrical outer surface of the bolt support portion 64 on the other side of the center axis 42C opposite the side toward which the stress Fx acts. Accordingly, as in the above-described first embodiment, the stresses Fx1-Fx4 acting at the centers of the bolts 42*a*-42*d* in the rotational direction of the wheel unit 10 are represented by the above-described Eqs. 5 to 8, respectively.

Further, in this second embodiment, correction coefficients α1-α4 for the stresses Fx1-Fx4 acting at the centers of the bolts 42*a*-42*d* in the rotational direction of the wheel unit 10 are previously obtained through, for example, an experiment, as coefficients for reducing detection errors stemming from variation in elastic deformation of each bolt support portion 64, variation in strain of each detection element 46, etc. Accordingly, the front-rear force Fxt acting from the road surface 56 to the tire 18 at the center P of the ground contact surface of the tire 18 is represented by the following Eq. 22.

$$Fxt = Ax(\alpha 1 Fx1 + \alpha 2 Fx2 + \alpha 3 Fx3 + \alpha 4 Fx4) \qquad (22)$$

Further, since the standard detected stresses fiox* and fioz* of each detection element 46 are calculated in accordance with the above-described Eqs. 20 and 21, the stresses Fy1-Fy4 acting at the centers of the bolts 42*a*-42*d* along the respective center axes 42C are represented by the following Eqs. 23 to 26, respectively.

$$Fy1 = ky(fx11 + fx12 + fz11 + fz12) \qquad (23)$$
$$= ky \left\{ \begin{array}{c} fix11 + fix12 + fiz11 + fiz12 - \\ 2(fiox1 + fioz1) - 4fi1(T1) \end{array} \right\}$$

$$Fy2 = ky(fx21 + fx22 + fz21 + fz22) \qquad (24)$$
$$= ky \left\{ \begin{array}{c} fix21 + fix22 + fiz21 + fiz22 - \\ 2(fiox2 + fioz2) - 4fi2(T2) \end{array} \right\}$$

$$Fy3 = ky(fx31 + fx32 + fz31 + fz32) \qquad (25)$$
$$= ky \left\{ \begin{array}{c} fix31 + fix32 + fiz31 + fiz32 - \\ 2(fiox3 + fioz3) - 4fi3(T3) \end{array} \right\}$$

$$Fy4 = ky(fx41 + fx42 + fz41 + fz42) \qquad (26)$$
$$= ky \left\{ \begin{array}{c} fix41 + fix42 + fiz41 + fiz42 - \\ 2(fiox4 + fioz4) - 4fi4(T4) \end{array} \right\}$$

Further, in this second embodiment, correction coefficients β1-β4 for the stresses Fy1-Fy4 acting at the centers of the bolts 42*a*-42*d* along the respective center axes 42C are previously obtained through, for example, an experiment, as coefficients for reducing detection errors stemming from variation in elastic deformation of each bolt support portion 64, variation in strain of each detection element 46, etc. Accordingly, the lateral force Fyt acting from the road surface 56 to the tire 18 at the center P of the ground contact surface of the tire 18 is represented by the following Eq. 27.

$$Fyt = Ay(\beta 1 Fy1 + \beta 2 Fy2 + \beta 3 Fy3 + \beta 4 Fy4) \qquad (27)$$

Further, in this second embodiment, since the coefficients α1-α4 for the stresses Fx1-Fx4 acting at the centers of the bolts 42*a*-42*d* in the rotational direction of the wheel unit 10 are previously obtained as described above, the stresses Fz1-Fz4 acting at the centers of the bolts 42*a*-42*d* in the vertical direction are represented by the following Eqs. 28 to 31 corresponding to the above-described Eqs. 15 to 18, respectively.

$$Fz1 = \{(\alpha 1 Fx1 - Fxt/4Ax)^2 + kz^2(fz11 - fz12)^2\}^{1/2} \qquad (28)$$
$$= \{(\alpha 1 Fx1 - Fxt/4Ax)^2 + kz^2(fiz11 - fiz12)^2\}^{1/2}$$

$$Fz2 = \{(\alpha 2 Fx2 - Fxt/4Ax)^2 + kz^2(fz21 - fz22)^2\}^{1/2} \qquad (29)$$
$$= \{(\alpha 2 Fx2 - Fxt/4Ax)^2 + kz^2(fiz21 - fiz22)^2\}^{1/2}$$

$$Fz3 = \{(\alpha 3 Fx3 - Fxt/4Ax)^2 + kz^2(fz31 - fz32)^2\}^{1/2} \qquad (30)$$
$$= \{(\alpha 3 Fx3 - Fxt/4Ax)^2 + kz^2(fiz31 - fiz32)^2\}^{1/2}$$

$$Fz4 = \{(\alpha 4 Fx4 - Fxt/4Ax)^2 + kz^2(fz41 - fz42)^2\}^{1/2} \qquad (31)$$
$$= \{(\alpha 4 Fx4 - Fxt/4Ax)^2 + kz^2(fiz41 - fiz42)^2\}^{1/2}$$

Further, in this second embodiment, correction coefficients γ1-γ4 for the stresses Fz1-Fz4 acting at the centers of the bolts 42*a*-42*d* in the vertical direction are previously obtained through, for example, an experiment, as coefficients for reducing detection errors stemming from variation in elastic deformation of each bolt support portion 64, variation in strain of each detection element 46, etc. Accordingly, the vertical force Fzt acting from the road surface 56 to the tire 18 at the center P of the ground contact surface of the tire 18 is represented by the following Eq. 32.

$$Fzt = Az(\gamma 1 Fz1 + \gamma 2 Fz2 + \gamma 3 Fz3 + \gamma 4 Fz4) \qquad (32)$$

As can be understood from the description above, on the basis of the current signals fed from the detection elements 46 and the temperature signal fed from the temperature sensor 54, the electronic circuit apparatus 50 calculates the front-rear force Fxt acting at the center P of the ground contact surface of the tire 18 in accordance with the above-described Eqs. 5 to 8 and the above-described Eq. 22, the lateral force Fyt acting at the center P of the ground contact surface of the tire 18 in accordance with the above-described Eqs. 20 and 21 and the above-described Eqs. 23 to 27, and the vertical force Fzt acting at the center P of the ground contact surface of the tire 18 in accordance with the above-described Eqs. 5 to 8 and the above-described Eqs. 28 to 32. Notably, the remaining portion of this second embodiment is configured in the same manner as in the case of the above-described first embodiment. Further, although the electronic circuit apparatus 50 of the second embodiment is disposed within the outboard end portion of the shaft portion 26 of the hub member 20, the electronic circuit apparatus 50 may be fixed to the outer surface of the flange portion 28.

Further, the front-rear force Fxt may be calculated in accordance with an equation obtained by inserting the above-described Eqs. 5 to 8 into the above-described Eq. 22; the lateral force Fyt may be calculated in accordance with an equation obtained by inserting the above-described Eqs. 20 and 21 and the above-described Eqs. 23 to 26 into the above-described Eq. 27; and the vertical force Fzt may be calculated in accordance with an equation obtained by inserting the above-described Eqs. 5 to 8 and the above-described Eqs. 28 to 31 into the above-described Eq. 32.

Figure 10:
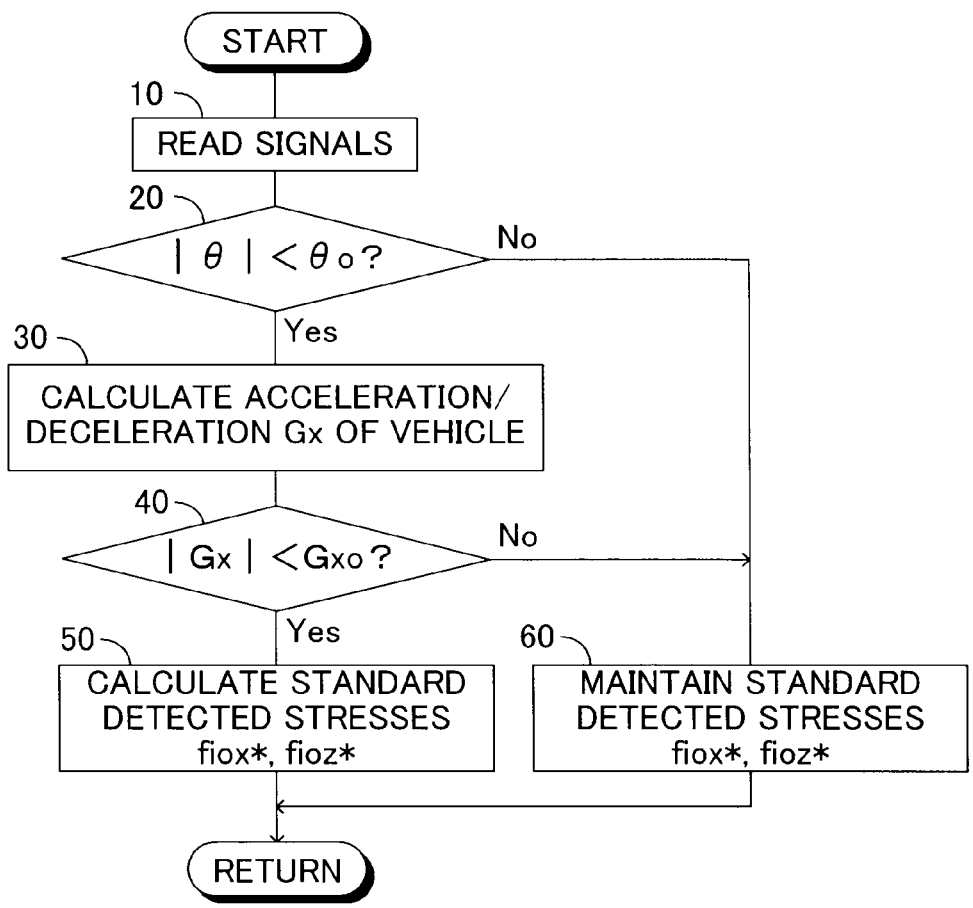
FIG. 10 is a flowchart showing a routing for calculating standard voltages Vox* and Voz* of detection elements in the second embodiment.

Next, a routine for calculating the standard detected stresses fiox* and fioz* of each detection element 46 in the second embodiment will be described with reference to a flowchart shown in FIG. 10. Calculation control in accordance with the flowchart shown in FIG. 10 is started when an unillustrated ignition switch is closed, and executed by the electronic circuit apparatus 50 at predetermined intervals. However, the second embodiment may be modified in such a manner that signals representing the front-rear force Fxt, etc. are fed to the unillustrated control apparatus of the vehicle; the calculation in accordance with the flowchart shown in FIG. 10 is performed by the control apparatus of the vehicle; and calculation results are fed to the electronic circuit apparatus 50 by means of communications.

First, in step 10, the electronic circuit apparatus 50 reads signals fed from the detection elements 46 and representing their output currents, and signals fed from the control apparatus of the vehicle and representing a steering angle $\theta$ and a vehicle speed V. In step 20, the electronic circuit apparatus 50 determines whether or not the absolute value of the steering angle $\theta$ is less than a reference value $\theta$o (e.g., a positive constant near zero); that is, whether or not all the wheel units are substantially at respective positions for allowing the vehicle to travel straight and no lateral force acts on the vehicle. When the electronic circuit apparatus 50 makes a "No" determination, it proceeds to step 60, and when the electronic circuit apparatus 50 makes a "Yes" determination, it proceeds to step 30.

In step 30, the electronic circuit apparatus 50 calculates an acceleration/decelartion Gx of the vehicle by, for example, calculating the difference between the current vehicle speed V and the vehicle speed V at a point in time preceding the present point in time by an amount corresponding to a predetermined number of cycles. In step 40, the electronic circuit apparatus 50 determines whether or not the absolute value of the acceleration/decelartion Gx of the vehicle is less than a reference value Gxo (e.g., a positive constant near zero); that is, whether or not the vehicle is traveling at a substantially constant speed and substantially no front-rear force and vertical force acts on the wheel units. When the electronic circuit apparatus 50 makes a "Yes" determination, it proceeds to step 50, and when the electronic circuit apparatus 50 makes a "No" determination, it proceeds to step 60.

In step 50, the electronic circuit apparatus 50 calculates the standard detected stresses fiox* and fioz* of each detection element 46 in accordance with the above-described Eqs. 20 and 21. In step 60, the electronic circuit apparatus 50 maintains the standard detected stresses fiox* and fioz* of each detection element 46 at the already calculated values. Notably, at the time of start of the control, the standard detected stresses fiox* and fioz* are set to previously set constant values or the values calculated last during the previous traveling of the vehicle.

Thus, according to the illustrated second embodiment, the stresses Fx1-Fx4 in the rotational direction of the wheel unit 10, the stresses Fy1-Fy4 in the lateral direction of the wheel unit 10, and the stresses Fz1-Fz4 in the vertical direction, which act on each bolt 42, can be obtained on the basis of a strain of each bolt support portion 64 caused by an elastic deformation thereof stemming from a stress acting from the wheel 16 onto the bolt 42, serving as a connection element. Further, the front-rear force Fxt, the lateral force Fyt, and the vertical force Fzt, which act from the road surface 56 to the tire 18, can be accurately calculated from these stresses in the same manner as in the case of the above-described first embodiment.

In particular, according to the illustrated second embodiment, the correction coefficients $\alpha 1$-$\alpha 4$ for the stresses Fx1-Fx4, the correction coefficients $\beta 1$-$\beta 4$ for the stresses Fy1-Fy4, and the correction coefficients $\gamma 1$-$\gamma 4$ for the stresses Fz1-Fz4 are previously obtained as coefficients for reducing detection errors stemming from variation in elastic deformation of each bolt support portion 64, variation in strain of each detection element 46, etc. Since the front-rear force Fxt, the lateral force Fyt, and the vertical force Fzt are calculated after the respective stresses are corrected by use of these correction coefficients, the front-rear force Fxt, the lateral force Fyt, and the vertical force Fzt can be accurately calculated, irrespective of variation in elastic deformation of the bolt support portion 64, etc., as compared with the case where the correction coefficients are not taken into consideration.

Further, according to the second embodiment, the standard detected stresses fioz* and fiox* of the detection element 46 are calculated in accordance with the above-described Eqs. 20 and 21, as the average of the detected stresses of the paired detection elements 46 facing each other with the center axis 42C located therebetween. Therefore, a detection error stemming from the individual difference of each detection element 46 or the like can be reduced effectively as compared with the case where the standard detected stresses are fixed.

Further, according to the second embodiment, since the detection elements 46 are fixed to the outer surface of the cylindrical tubular portion of each bolt support portion 64, the ratio of the amount of strain of each detection element 46 to the stress acting on each bolt 42 can be made larger as compared with the case of the above-described first embodiment, whereby the S/N ratio of the stress detection by the detection element 46 can be increased, and the front-rear force Fxt, the lateral force Fyt, and the vertical force Fzt can be calculated more accurately than in the case of the above-described first embodiment.

Notably, in the above-described second embodiment, the front-rear force Fxt, the lateral force Fyt, and the vertical force Fzt are calculated after the stresses Fx1-Fx4 in the rotational direction, the stresses Fy1-Fy4 in the lateral direction, and the stresses Fz1-Fz4 in the vertical direction are corrected by use of the correction coefficients $\alpha 1$-$\alpha 4$, $\beta 1$-$\beta 4$, and $\gamma 1$-$\gamma 4$ for reducing detection errors stemming from variation in elastic deformation of each bolt support portion 64, variation in strain of each detection element 46, etc. However, correction performed by use of any of these correction coefficients may be omitted.

Alternatively, the above-described first embodiment and third through fifth embodiments to be described later, in which the respective stresses are not corrected by use of the correction coefficients $\alpha 1$-$\alpha 4$, $\beta 1$-$\beta 4$, $\gamma 1$-$\gamma 4$, may be modified to calculate the front-rear force Fxt, the lateral force Fyt, and the vertical force Fzt after correcting the stresses Fx1-Fx4 in the rotational direction, the stresses Fy1-Fy4 in the lateral direction, and the stresses Fz1-Fz4 in the vertical direction in the same manner as in the above-described second embodiment.

Third Embodiment

Figure 11:
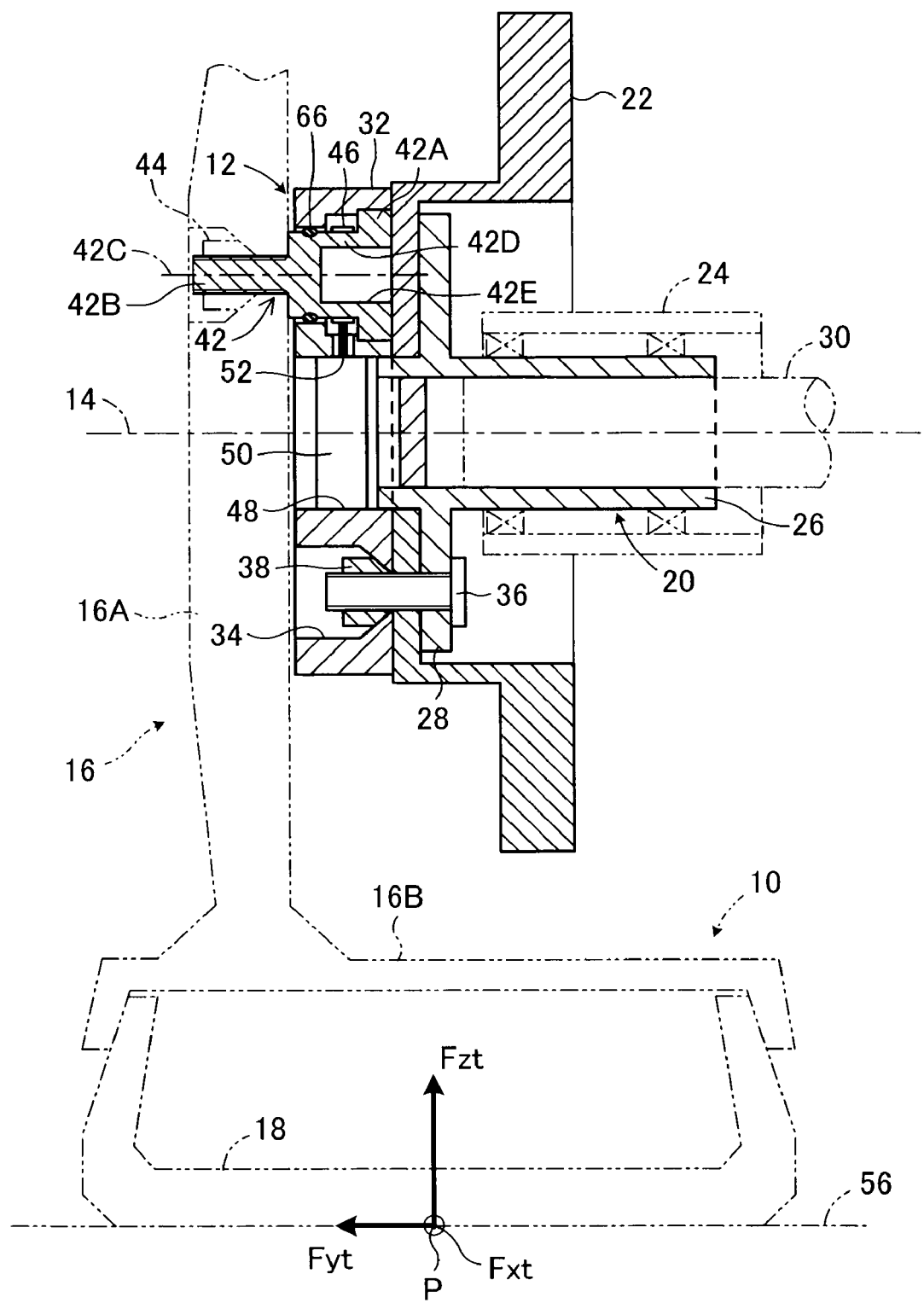
FIG. 11 is a cross sectional view of a third embodiment of the tire-acting-force detection apparatus according to the present invention applied to a drive wheel unit, taken along a cutting plane (XI-XI of FIG. 12) passing through the rotation axis of the wheel unit.
Figure 12:
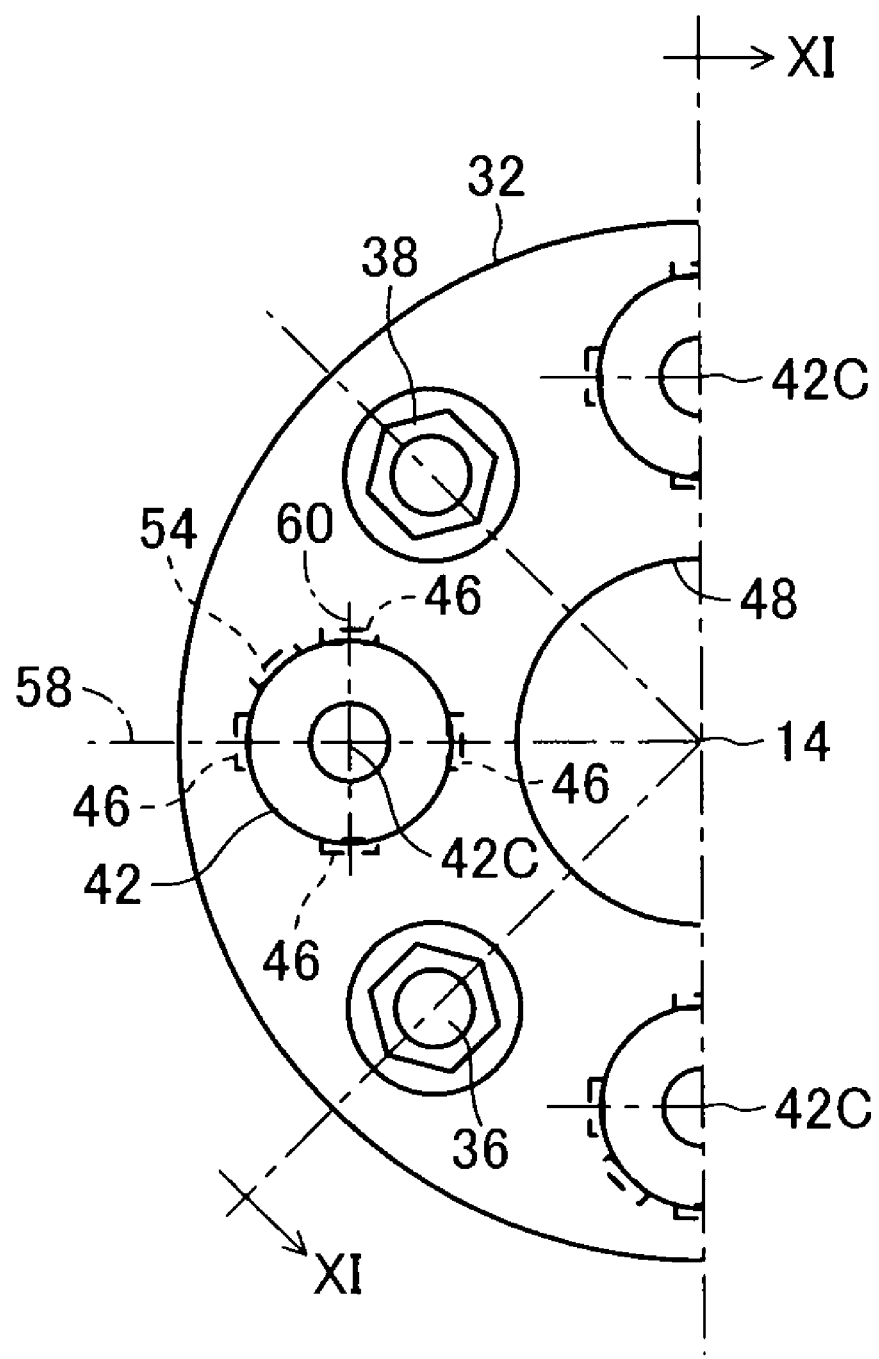
FIG. 12 is a half front view of a main portion of the third embodiment as viewed from the outboard side of the vehicle.

FIG. 11 is a cross sectional view of a third embodiment of the tire-acting-force detection apparatus according to the present invention applied to a drive wheel unit, taken along a cutting plane (XI-XI of FIG. 12) passing through the rotation axis of the wheel unit. FIG. 12 is a half front view of a main portion of the third embodiment as viewed from the outboard side of the vehicle.

In this third embodiment, which is a modification of the first embodiment, each bolt 42 has an intermediate diameter cylindrical columnar intermediate portion 42D located between a large diameter root portion 42A and a small diameter thread portion 42B and extending along the center axis 42C. Further, each bolt 42 includes a cylindrical columnar recess 42E extending from the end surface of the root portion 42A along the center axis 42C, so that the intermediate portion 42D partially assumes the form of a cylindrical tube.

Each of the holes 40 provided in the disk member 32 has a large diameter portion, a small diameter portion, and an intermediate portion located therebetween and having an inner diameter between those of the large diameter portion and the small diameter portion. The large diameter root portion 42A of each bolt 42 is fixedly fitted into the large diameter portion of the corresponding hole 40 through press-fitting, whereby each bolt 42 is supported at the root portion 42A in a cantilevered fashion. The small diameter portion of each hole 40 has an inner diameter slightly larger than the outer diameter of the intermediate portion 42D of the bolt 42, so that the intermediate portion 42D is loosely fitted into the small diameter portion of the hole 40. An O-ring seal 66 formed of an elastic material such as rubber and annularly extending about the center axis 42C is disposed between the wall surface of the small diameter portion of the hole 40 and the intermediate portion 42D of the bolt 42.

In this third embodiment, the detection elements 46 and the temperature sensor 54 are fixed to the outer surface of the intermediate portion 42D at a position corresponding to the intermediate portion of the hole 40. The positional relations of the four detection elements 46 with respect to the rotation axis 14 and the center axis 42C of the bolt 42 are the same as those in the above-described first embodiment. Further, the stress detection characteristic and temperature characteristic of the detection elements 46 are the same as those in the above-described first embodiment.

Thus, as in the case of the above-described first embodiment, the hub member 20 and the disk member 32 cooperatively function as a wheel support member which has a wheel support portion extending perpendicular to the rotation axis 14. The disk member 32, the bolt 42, and the nut 44 cooperatively function as four connection means which connect the circular plate portion 16A of the wheel 16 to the wheel support portion of the wheel support member at four positions separated from one another about the rotation axis 14.

In this case, when the bolt 42 cantilevered at the root portion 42A greatly curves due to elastic deformation, the intermediate portion 42D comes into contact with the wall surface of the small diameter portion of the hole 40, whereby further elastic deformation of the bolt 42 is limited. Therefore, the small diameter portion of the hole 40 functions as load limiting means for limiting load so as to prevent application of excessive bending stress on the bolt 42. Further, the O-ring seal 66 permits elastic deformation of the bolt 42, and functions as an elastic seal for preventing entry of foreign substances, such as dust and muddy water, into the space between the disk member 32 and the bolt 42 in which the detection elements 46 and the temperature sensor 54 are provided.

The remaining portion of this third embodiment is configured in the same manner as in the case of the above-described first embodiment. Further, on the basis of the current signals fed from the detection elements 46 and the temperature signal fed from the temperature sensor 54, the electronic circuit apparatus 50 calculates the front-rear force Fxt, the lateral force Fyt, and the vertical force Fzt acting at the center P of the ground contact surface of the tire 18, in the same manner as in the above-described first embodiment.

Thus, according to the illustrated third embodiment, the stresses Fx1-Fx4 in the rotational direction of the wheel unit 10, the stresses Fy1-Fy4 in the lateral direction of the wheel unit 10, and the stresses Fz1-Fz4 in the vertical direction, which act on each bolt 42, can be obtained on the basis of a strain of each bolt 42 caused by an elastic deformation thereof stemming from a stress acting from the wheel 16 onto the bolt 42, serving as a connection element. Further, as in the case of the above-described first and second embodiments, the front-rear force Fxt, the lateral force Fyt, and the vertical force Fzt, which act from the road surface 56 to the tire 18, can be accurately calculated from these stresses.

In particular, according to the third embodiment, each bolt 42 has the recess 42E, and the detection elements 46 are fixed to the outer surface of the cylindrical tubular intermediate portion 42D. Therefore, as compared with the case of the above-described first embodiment, the ratio of the amount of strain of each detection element 46 to the stress acting on each bolt 42 can be made larger, whereby the S/N ratio of the stress detection by the detection element 46 can be increased, and the front-rear force Fxt, the lateral force Fyt, and the vertical force Fzt can be calculated more accurately than in the case of the above-described first embodiment.

Further, according to the third embodiment, since the small diameter portion of the hole 40 of the disk member 32 functions as load limiting means for limiting load so as to prevent application of excessive bending stress on the bolt 42, the application of excessive bending stress on the bolt 42 can be prevented effectively, while the high S/N ratio of the stress detection is secured. Thus, it is possible to effectively prevent the rotation axis 14 of the wheel unit 10 from excessively moving due to force acting on the tire 18.

Notably, in the above-described first through third embodiments, the detection elements which detect stresses acting on the connection means composed of the bolt 42, the bolt support portion 64, etc., are of a single type; i.e., the detection elements 46, which detect a strain of the bolt 42 or the bolt support portion 64 stemming from an elastic deformation thereof. Therefore, as compared with the case of fourth and fifth embodiments to be described later in which a plurality of types of detection elements are used, the structure of the tire-acting-force detection apparatus 12 can be simplified, and cost can be reduced.

Further, according to the above-described first through third embodiments, the bolt 42 is cantilevered at the end portion having a large diameter. Therefore, as compared with the case where the diameter of the portion at which the bolt 42 is cantilevered is smaller than that in the illustrated embodiments, the possibility of the strength of the bolt 42 becoming insufficient can be reduced without fail, and the durabilities of the vehicle and the tire-acting-force detection apparatus 12 can be improved.

Fourth Embodiment

Figure 13:
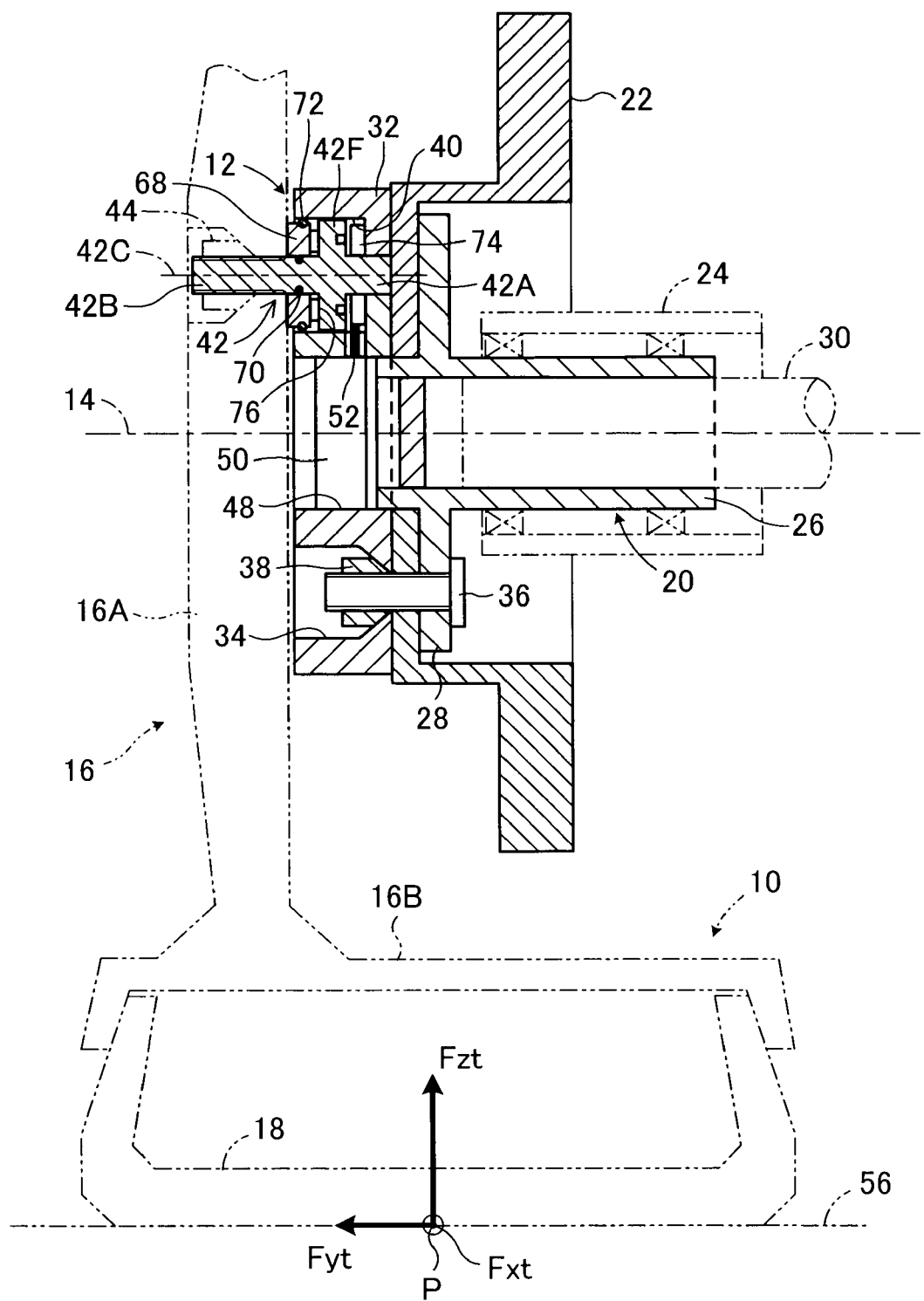
FIG. 13 is a cross sectional view of a fourth embodiment of the tire-acting-force detection apparatus according to the present invention applied to a drive wheel unit, taken along a cutting plane (XIII-XIII of FIG. 14) passing through the rotation axis of the wheel unit.
Figure 14:
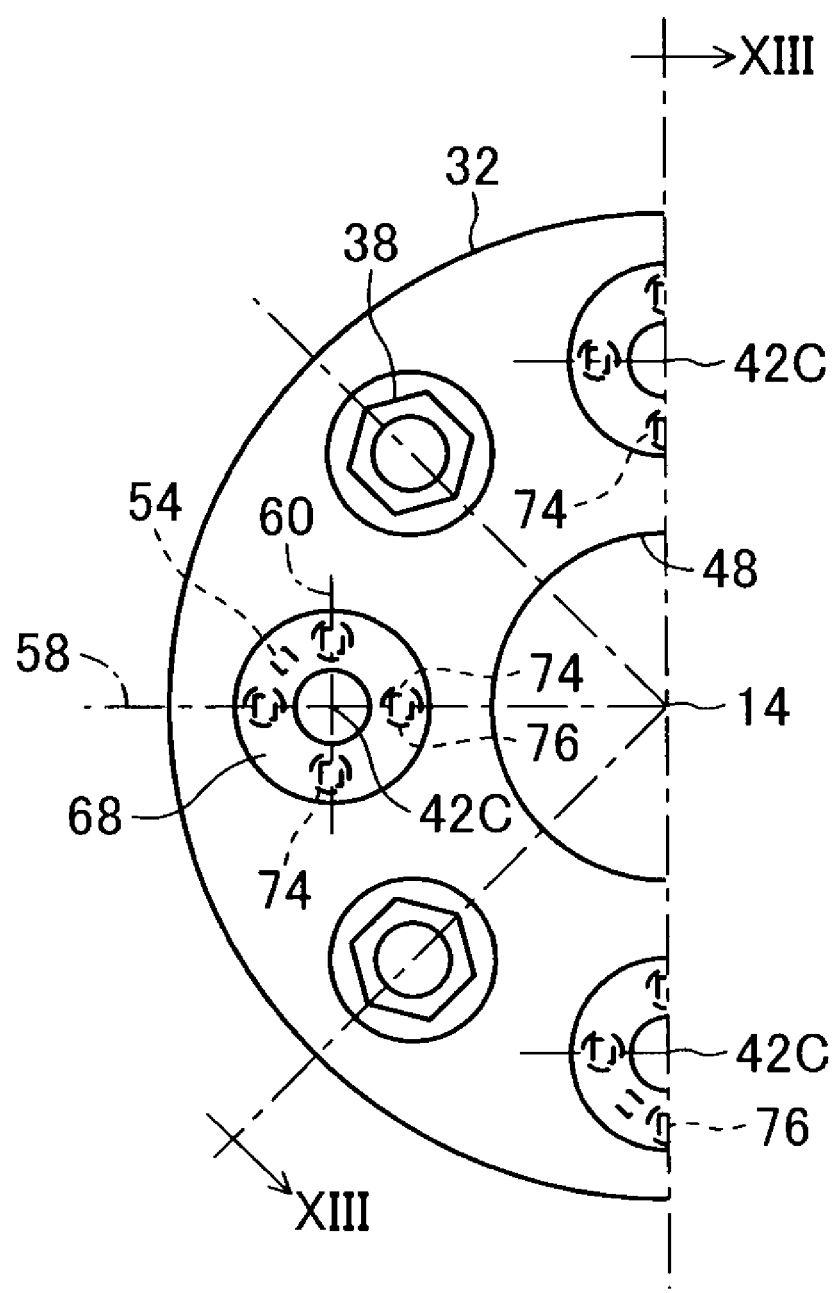
FIG. 14 is a half front view of a main portion of the fourth embodiment as viewed from the outboard side of the vehicle.

FIG. 13 is a cross sectional view of a fourth embodiment of the tire-acting-force detection apparatus according to the present invention applied to a drive wheel unit, taken along a cutting plane (XIII-XIII of FIG. 14) passing through the rotation axis of the wheel unit. FIG. 14 is a half front view of a main portion of the fourth embodiment as viewed from the outboard side of the vehicle.

In this fourth embodiment, which is a modification of the first embodiment, each bolt 42 has a circular-plate-like flange portion 42F located between a small diameter root portion 42A and a small diameter thread portion 42B, extending perpendicularly to the center axis 42C, and having a large diameter. A distal end portion of the root portion 42A is press-fitted into a small diameter portion of the hole 40 of the disk member 32, whereby the root portion 42A is fixed to the disk member 32. Thus, the bolt 42 is supported by the disk member 32 in a cantilevered fashion at the distal end portion of the root portion 42A.

The flange portion 42F is separated toward the wheel unit 10 side from the small diameter portion of the hole 40 along the center axis 42C, and has an outer diameter slightly smaller than the inner diameter of a large diameter portion of the hole 40. A load transmission ring 68 formed of a metal is fitted into the outboard end of the large diameter portion of the hole 40. The load transmission ring 68 is separated toward the wheel unit 10 side from the flange portion 42F along the center axis 42C, and has an outer diameter very slightly smaller than the inner diameter of the large diameter portion of the hole 40. The load transmission ring 68 is fitted substantially closely to the small diameter portion of the bolt 42 located on the side of the flange portion 42F opposite the root portion 42A. An O-ring seal 70 formed of an elastic material such as rubber is disposed between the inner circumferential surface of the load transmission ring 68 and the circumferential surface of the small diameter portion of the bolt 42. Further, an O-ring seal 72 formed of an elastic material such as rubber is disposed between the outer circumferential surface of the load transmission ring 68 and the wall surface of the large diameter portion of the hole 40.

The O-ring seals 70 and 72 function as elastic seals which prevent entry of foreign substances, such as dust and muddy water, into a space extending from the load transmission ring 68 toward the root portion 42A. Further, the O-ring seal 72 enables the bolt 42 to elastically deform in a direction perpendicular to the center axis 42C. When the bolt 42 elastically deforms to a great extent, the outer circumferential surface of the load transmission ring 68 comes into contact with the wall surface of the large diameter portion of the hole 40, whereby further elastic deformation of the bolt 42 is limited. Therefore, the load transmission ring 68 functions as load limiting means for limiting load so as to prevent application of excessive bending stress on the bolt 42.

Four first detection elements 74 are disposed in a space between the flange portion 42F and a portion defining the small diameter portion of the hole 40, and four second detection elements 76 and one temperature sensor 54 are disposed in a space between the flange portion 42F and the load transmission ring 68. The first detection elements 74, the second detection elements 76, and the temperature sensor 54 are disposed on each bolt at the same circumferential positions as those of the detection elements 46 and the temperature sensor in the above-described first embodiment. Notably, even in a state where the wheel unit 10 is fixed to the disk member 32 by means of the bolts 42 and the nuts 44 and a predetermined compressive stress acts on the second detection elements 76, the load transmission ring 68 slightly projects from the outboard side surface of the disk member 32, and comes into contact with the circular plate portion 16A of the wheel 16, to thereby prevent the circular plate portion 16A from coming into direct contact with the outboard end of the bolt support portion 64, and transmit to the second detection elements 76 a stress acting on the wheel 16 along the rotation axis 14.

Specifically, each first detection element 74 is a Hall-IC-type displacement sensor composed of a permanent magnet fixed to the flange portion 42F, and a detector fixed to the disk member 32 and separated from the permanent magnet along the center axis 42C. The first detection element 74 detects a change in magnetic field caused by a relative displacement of the flange portion 42F in relation to the disk member 32 in a direction perpendicular to the center axis 42C, as an amount of relative displacement of the flange portion 42F in relation to the disk member 32, to thereby enable detection of the stress Fxz acting on the thread portion 42B of the bolt 42 perpendicular to the center axis 42C.

Figure 15:
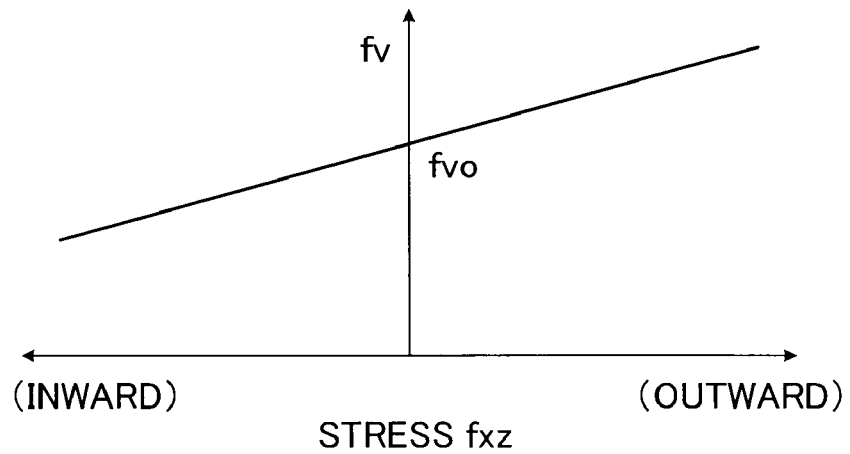
FIG. 15 is a graph showing the relation between stress Fxz acting on each bolt perpendicular to the center axis thereof and stress fv detected by a first detection element.

In this case, each first detection element 74 is adjusted such that the detected stress fv at the time when no extra stress Fxz other than the stress due to the vehicle weight acts on the thread portion 42B of the bolt 42 in any direction coincides with a standard detected stress fvo (positive constant). As shown in FIG. 15, the detected stress fv of each first detection element 74 increases from the standard detected stress fvo in proportion to the stress Fxz when the acting direction of the stress Fxz acting on the thread portion 42B of the bolt 42 perpendicularly to the center axis 42C is outward in the radial direction of the bolt 42 as viewed at the position of the first detection element 74, The detected stress fv of each first detection element 74 decreases from the standard detected stress fvo in proportion to the stress Fxz when the acting direction of the stress Fxz is inward in the radial direction of the bolt 42 as viewed at the position of the certain first detection element 74.

Figure 16:
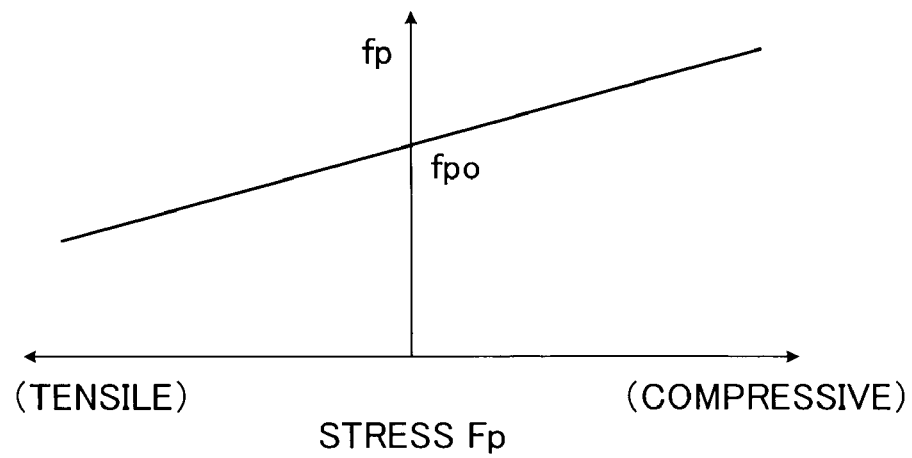
FIG. 16 is a graph showing the relation between stress Fp acting on each bolt along the center axis thereof and stress fp detected by a second detection element.

Meanwhile, each second detection element 76 is a surface pressure sensor, and detects a stress Fp acting on the thread portion 42B of the corresponding bolt 42 along the center axis 42C by detecting the surface pressure between the flange portion 42F and the load transmission ring 68. In this case, each second detection element 76 is adjusted such that the detected stress fp at the time when the stress Fp is zero coincides with a standard detected stress fpo (positive constant). As shown in FIG. 16, when the stress Fp is a tensile stress, the detected stress fp of each second detection element 76 decreases from the standard detected stress fpo in proportion to the stress Fp; and when the stress Fp is a compressive stress, the detected stress fp of each second detection element 76 increases from the standard detected stress fpo in proportion to the stress Fp.

Voltage signals representing the stresses detected by the first detection elements 74 and the second detection elements 76 are fed to the electronic circuit apparatus 50, along with a signal representing the temperature detected by the temperature sensor 54. The first detection elements 74 and the second detection elements 76 have respective temperature characteristics. When the temperatures of the bolts 42a-42d detected by the temperature sensors 54 are represented by T1-T4, the temperature-dependent variations of the detected stresses fv of the first detection elements 74 of the bolts 42a to 42d are represented by functions fv1(T1)-fv4(T4) of the temperatures T1-T4, and the temperature-dependent variations of the detected stresses fp of the second detection elements 76 of the bolts 42a to 42d are represented by functions fp1(T1)-fp4(T4) of the temperatures T1-T4.

Figure 17:
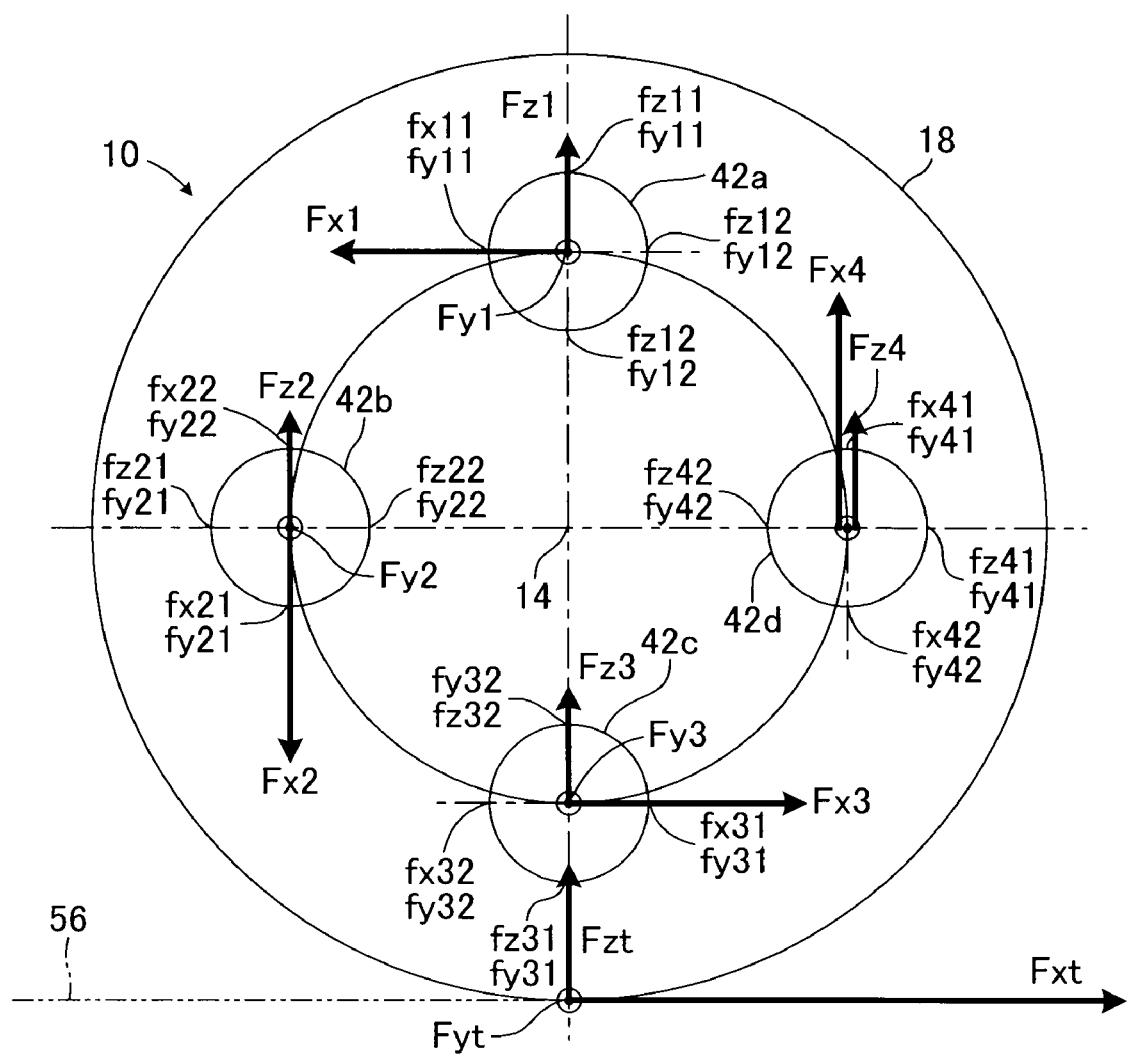
FIG. 17 is a front view of a main portion of the fourth embodiment as viewed from the outboard side of the vehicle.

FIG. 17 is an explanatory view showing the stresses detected by the first detection elements 74 and the second detection elements 76 in the fourth embodiment, as viewed from the outboard side of the wheel unit 10. As shown in FIG. 17, the four bolts 42 are denoted by 42a to 42d. Stresses which are to be detected by the first detection elements 74 located on the outer sides of the bolts 42a to 42d with respect to the radial direction of the wheel unit 10 are represented by fz11, fz21, fz31, and fz41, respectively; and the detected stresses of these detection elements 74 are represented by fvz11, fvz21, fvz31, and fvz41, respectively. Similarly, stresses which are to be detected by the first detection elements 74 located on the inner sides of the bolts 42a to 42d with respect to the radial direction of the wheel unit 10 are represented by fz12, fz22, fz32, and fz42, respectively; and the detected stresses of these detection elements 74 are represented by fvz12, fvz22, fvz32, and fvz42, respectively.

Further, stresses which are to be detected by the first detection elements 74 located at positions separated 90° counterclockwise from the first detection elements 74 located on the outer sides of the bolts 42a to 42d with respect to the radial direction of the wheel unit 10 are represented by fx11, fx21, fx31, and fx41, respectively; and the detected stresses of these first detection elements 74 are represented by fvx11, fvx21, fvx31, and fvx41, respectively. Similarly, stresses which are to be detected by the first detection elements 74 located at positions separated 90° counterclockwise from the first detection elements 74 located on the inner sides of the bolts 42a to 42d with respect to the radial direction of the wheel unit 10 are represented by fx12, fx22, fx32, and fx42, respectively; and the detected stresses of these first detection elements 74 are represented by fvx12, fvx22, fvx32, and fvx42, respectively The stresses Fx*1, Fx*2, Fz*1, and Fz*2 which act on the thread portion 42B of each bolt 42a-42 perpendicular to the center axis 42C at positions corresponding to the first detection elements 74 are represented by the following Eqs. 33 to 36.

$$Fx^*1 = fvx^*1 - fvo - fv^*(T^*) \quad (33)$$

$$Fx^*2 = fvx^*2 - fvo - fv^*(T^*) \quad (34)$$

$$Fz^*1 = fvz^*1 - fvo - fv^*(T^*) \quad (35)$$

$$Fz^*2 = vfz^*2 - fvo - fv^*(T^*) \quad (36)$$

Therefore, the stresses Fx1, Fx2, Fx3, and Fx4, which act on the thread portions 42B of the bolts 42a-42d perpendicularly to the respective center axes 42C and in the rotational direction of the wheel unit 10, are represented by the following Eq. 37 to 40; and the front-rear force Fxt acting from the road surface 56 to the tire 18 at the center P of the ground contact surface of the tire 18 is represented by the above-described Eq. 9.

$$Fx1 = kx(fx11 - fx12) \\ = kx(fvx11 - fvx12) \quad (37)$$

$$Fx2 = kx(fx21 - fx22) \\ = kx(fvx21 - fvx22) \quad (38)$$

$$Fx3 = kx(fx31 - fx32) \\ = kx(fvx31 - fvx32) \quad (39)$$

$$Fx4 = kx(fx41 - fx42) \\ = kx(fvx41 - fvx42) \quad (40)$$

Further, when the stresses to be detected by the second detection elements 76 are represented by fy*1-fy*4, the stresses Fy1-Fy4, which act at the centers of the bolts 42a-42d along the respective center axes 42C are represented by the following Eqs. 41 to 44, respectively; and the lateral force Fyt acting from the road surface 56 to the tire 18 at the center P of the ground contact surface of the tire 18 is represented by the above-described Eq. 14.

$$Fy1 = ky(fy11 + fy12 + fy13 + fy14) \\ = ky\left\{ \begin{array}{c} fp11 + fp12 + fp13 + fp14 - \\ 4(fpo + fp1(T1)) \end{array} \right\} \quad (41)$$

$$Fy2 = ky(fy21 + fy22 + fy23 + fy24) \\ = ky\left\{ \begin{array}{c} fp21 + fp22 + fp23 + fp24 - \\ 4(fpo + fp2(T2)) \end{array} \right\} \quad (42)$$

$$Fy3 = ky(fy31 + fy32 + fy33 + fy34) \\ = ky\left\{ \begin{array}{c} fp31 + fp32 + fp33 + fp34 - \\ 4(fpo + fp3(T3)) \end{array} \right\} \quad (43)$$

$$Fy4 = ky(fy41 + fy42 + fy43 + fy44) \\ = ky\left\{ \begin{array}{c} fp41 + fp42 + fp43 + fp44 - \\ 4(fpo4 + fp4(T4)) \end{array} \right\} \quad (44)$$

Moreover, the stresses Fz1-Fz4, which act on the centers of the bolts 42a-42d in the vertical direction are respectively represented by the following Eqs. 45 to 48 corresponding to the above-described Eqs. 15 to 18; and the vertical force Fzt acting from the road surface 56 to the tire 18 at the center P of the ground contact surface of the tire 18 is represented by the above-described Eq. 19.

$$Fz1 = \{(Fx1 - Fxt/4Ax)^2 + kz^2(Fz11 - Fz12)^2\}^{1/2} \\ = \{(Fx1 - Fxt/4Ax)^2 + kz^2(fvz11 - fvz12)^2\}^{1/2} \quad (45)$$

$$Fz2 = \{(Fx2 - Fxt/4Ax)^2 + kz^2(Fz21 - Fz22)^2\}^{1/2} \\ = \{(Fx2 - Fxt/4Ax)^2 + kz^2(fvz21 - fvz22)^2\}^{1/2} \quad (46)$$

$$Fz3 = \{(Fx3 - Fxt/4Ax)^2 + kz^2(Fz31 - Fz32)^2\}^{1/2} \\ = \{(Fx3 - Fxt/4Ax)^2 + kz^2(fvz31 - fvz32)^2\}^{1/2} \quad (47)$$

$$Fz4 = \{(Fx4 - Fxt/4Ax)^2 + kz^2(Fz41 - Fz42)^2\}^{1/2} \\ = \{(Fx4 - Fxt/4Ax)^2 + kz^2(fvz41 - fvz42)^2\}^{1/2} \quad (48)$$

As can be understood from the description above, on the basis of the voltage signals fed from the first detection elements 74 and the second detection elements 76 and the temperature signal fed from the temperature sensor 54, the electronic circuit apparatus 50 calculates the front-rear force Fxt acting at the center P of the ground contact surface of the tire 18 in accordance with the above-described Eqs. 37 to 40 and the above-described Eq. 9, the lateral force Fyt acting at the center P of the ground contact surface of the tire 18 in accordance with the above-described Eqs. 41 to 44 and the above-described Eq. 14, and the vertical force Fzt acting at the center P of the ground contact surface of the tire 18 in accordance with the above-described Eqs. 45 to 48 and the above-described Eq. 19.

The front-rear force Fxt may be calculated in accordance with an equation obtained by inserting the above-described Eqs. 37 to 40 into the above-described Eq. 9; the lateral force Fyt may be calculated in accordance with an equation obtained by inserting the above-described Eqs. 41 to 44 into the above-described Eq. 14; and the vertical force Fzt may be calculated in accordance with an equation obtained by inserting the above-described Eqs. 45 to 48 into the above-described Eq. 19.

Thus, according to the illustrated fourth embodiment, the stresses Fx1-Fx4 in the rotational direction of the wheel unit 10, the stresses Fy1-Fy4 in the lateral direction of the wheel unit 10, and the stresses Fz1-Fz4 in the vertical direction, which act on each bolt 42 can be obtained on the basis of the relative displacement of the flange portion 42F in the radial direction in relation to the disk member 32 and a change in the surface pressure in the axial direction between the flange portion 42F and the load transmission ring 68, which are caused by an elastic deformation of each bolt 42 stemming from a stress acting from the wheel 16 onto the bolt 42, serving as a connection element. Further, the front-rear force Fxt, the lateral force Fyt, and the vertical force Fzt, which act from the road surface 56 to the tire 18, can be accurately calculated from these stresses in the same manner as in the case of the above-described first through third embodiments.

In particular, according to the fourth embodiment, the stresses Fx1-Fx4 in the rotational direction of the wheel unit 10 and the stresses Fz1-Fz4 in the vertical direction, which act on each bolt 42 are calculated on the basis of the relative displacement of the flange portion 42F in the radial direction in relation to the disk member 32, which is detected by the first detection elements 74; and the stresses Fy1-Fy4 in the lateral direction of the wheel unit 10 are calculated on the basis of a change in the surface pressure between the flange portion 42F and the load transmission ring 68, which is detected by the second detection elements 76. Therefore, these stresses can be calculated more accurately, as compared with the case of the above-described first through third embodiments, in which all the stresses Fx1-Fx4 in the rotational direction, the stresses Fy1-Fy4 in the lateral direction, and the stresses Fz1-Fz4 in the vertical direction are calculated on the basis of the detection values of the detection elements 46 of a single type.

Further, according to the fourth embodiment, each bolt 42 is small in diameter except for the flange portion 42F. Therefore, by means of increasing the ratios of the relative displacement in the radial direction and the change in surface pressure to the stresses acting on each bolt 42 to thereby increase the S/N ratio of the stress detection by the first detection elements 74 and the second detection elements 76, the front-rear force Fxt, the lateral force Fyt, and the vertical force Fzt can be calculated more accurately, as compared with the case of the above-described first embodiment.

Further, according to the fourth embodiment, the load transmission ring 68 formed of metal is fitted into the outboard end of the large diameter portion of the hole 40, and the load transmission ring 68 functions as load limiting means for limiting load so as to prevent application of excessive bending stress on the bolt 42. Therefore, as in the case of the above-described third embodiment, the application of excessive bending stress on the bolt 42 can be prevented effectively, while the high S/N ratio of the stress detection is secured. Thus, it is possible to effectively prevent the rotation axis 14 of the wheel unit 10 from excessively moving due to force acting on the tire 18.

Notably, the detection values of the first detection elements 74 are influenced by displacement of the flange portion 42F along the center axis 42C. When the influence is relatively large, the stresses Fx1-Fx4 in the rotational direction may be corrected on the basis of the stresses Fy1-Fy4 in the lateral direction of the wheel unit 10.

Fifth Embodiment

Figure 18:
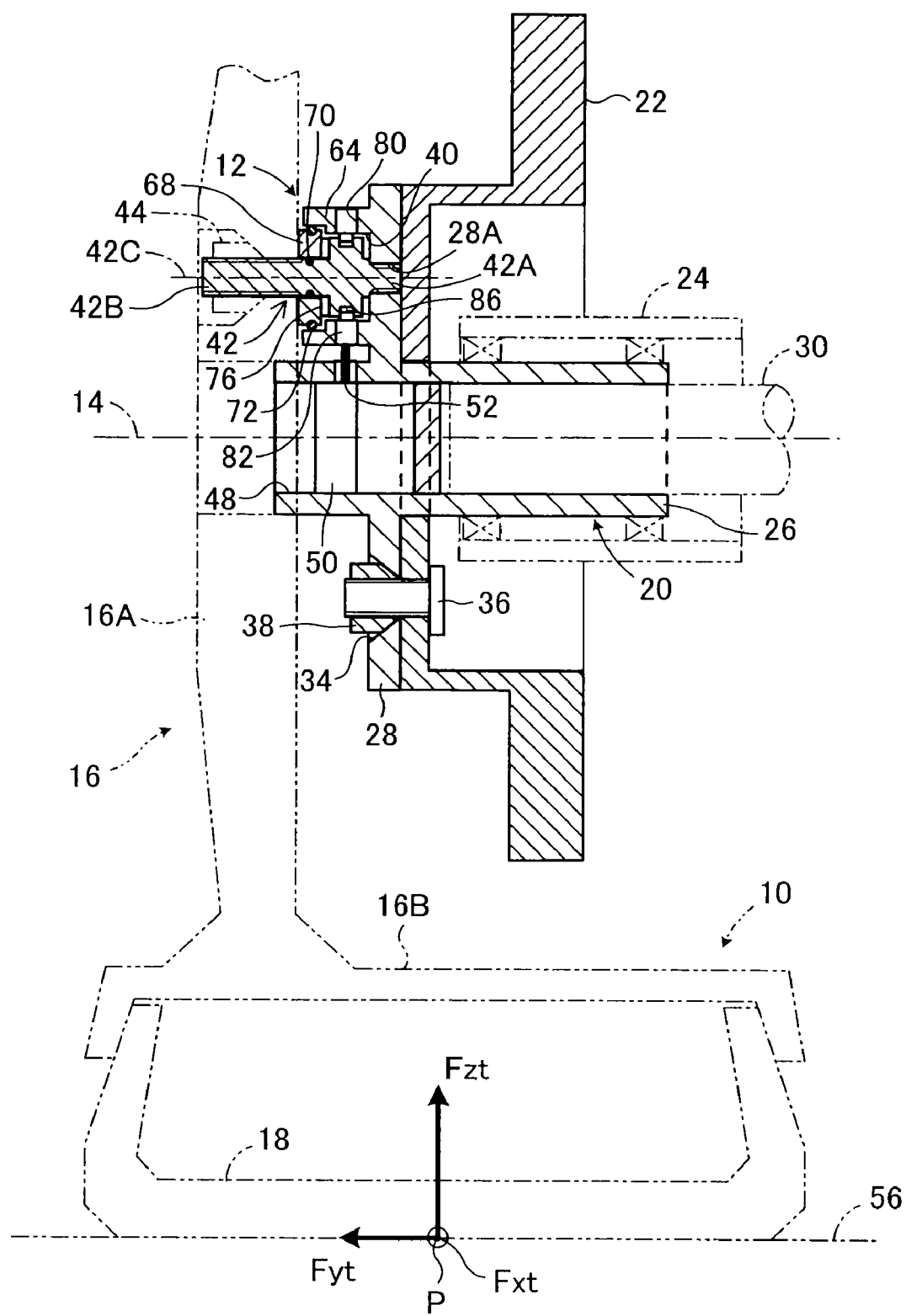
FIG. 18 is a cross sectional view of a fifth embodiment of the tire-acting-force detection apparatus according to the present invention applied to a drive wheel unit, taken along a cutting plane (XVIII-XVIII of FIG. 19) passing through the rotation axis of the wheel unit.
Figure 19:
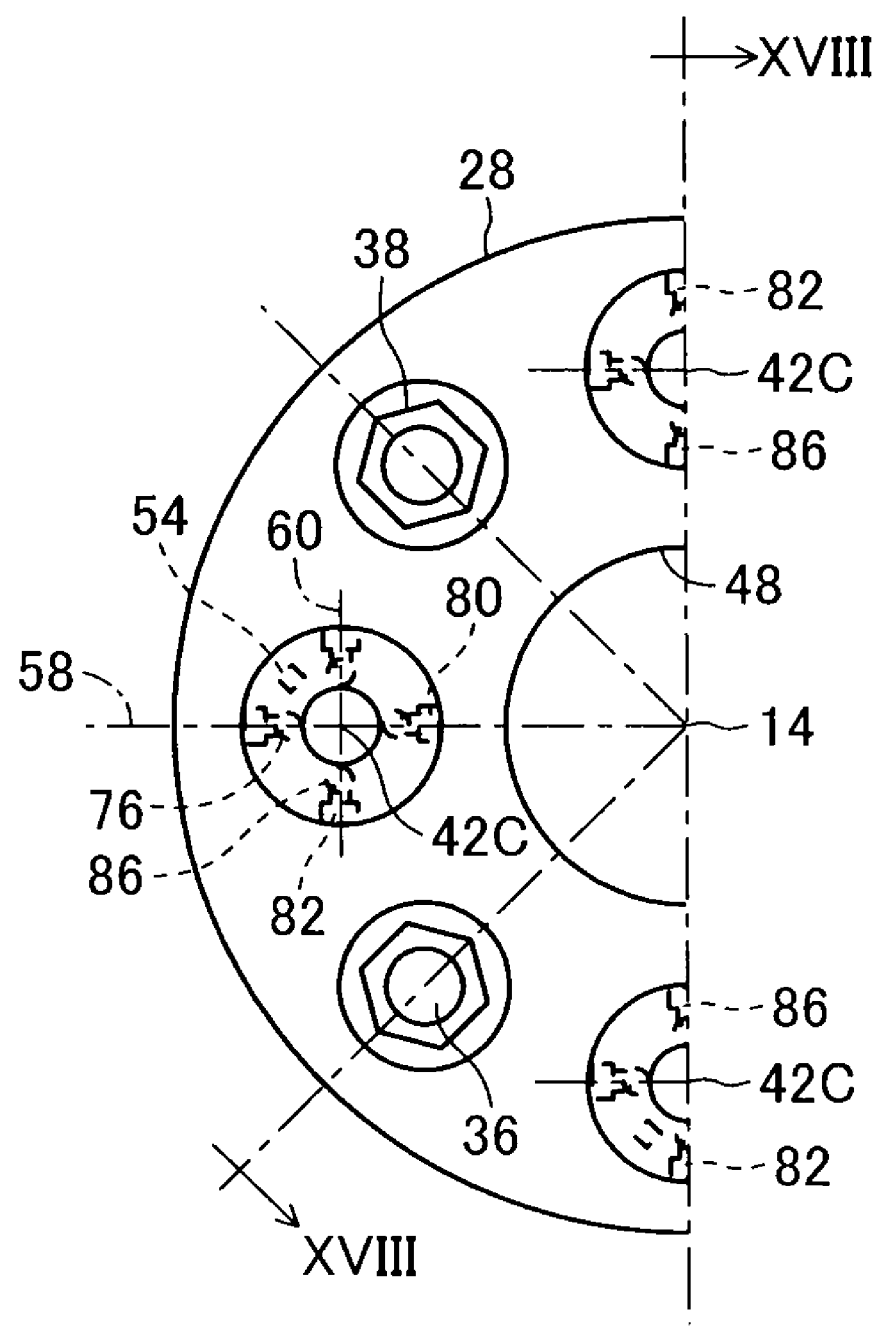
FIG. 19 is a half front view of a main portion of the fifth embodiment as viewed from the outboard side of the vehicle.

FIG. 18 is a cross sectional view of a fifth embodiment of the tire-acting-force detection apparatus according to the present invention applied to a drive wheel unit, taken along a cutting plane (XVIII-XVIII of FIG. 19) passing through the rotation axis of the wheel unit. FIG. 19 is a half front view of a main portion of the fifth embodiment as viewed from the outboard side of the vehicle.

In this fifth embodiment, which is a modification of the above-described second embodiment, the disk member 32 is not provided. In this fifth embodiment, as in the case of the above-described fourth embodiment, each bolt 42 has a circular-plate-like flange portion 42F located between a small diameter root portion 42A and a small diameter thread portion 42B, extending perpendicularly to the center axis 42C, and having a large diameter. The small diameter root portion 42A is screwed into a threaded hole 28A of the flange portion 28 of the hub 20 in a state where the bolt 42 is passed through a bolt support portion 64 provided on the flange portion 28. Thus, the bolt 42 is supported by the disk member 32 in a cantilevered fashion at the distal end portion of the root portion 42A.

As in the case of the above-described fourth embodiment, the flange portion 42F is separated from the flange portion 28 toward the wheel unit 10 side along the center axis 42C, and has an outer diameter slightly smaller than the inner diameter of the bolt support portion 64. A load transmission ring 68 formed of a metal is fitted into the outboard end portion of the bolt support portion 64. The load transmission ring 68 is separated toward the wheel unit 10 side from the flange portion 42F along the center axis 42C, and has an outer diameter very slightly smaller than the inner diameter of the outboard end portion of the bolt support portion 64. The load transmission ring 68 is fitted substantially closely to the small diameter portion of the bolt 42 located on the side of the flange portion 42F opposite the root portion 42A. An O-ring seal 70 formed of an elastic material such as rubber is disposed between the inner circumferential surface of the load transmission ring 68 and the circumferential surface of the small diameter portion of the bolt 42. Further, an O-ring seal 72 formed of an elastic material such as rubber is disposed between the outer circumferential surface of the load transmission ring 68 and the inner circumferential surface of the bolt support portion 64.

In each bolt support portion 64, four threaded holes 80 aligned with the above-mentioned straight lines 58 and 60 are provided; and screws 82 are screwed into the respective threaded holes 80. Recesses are provided in the outer circumferential portion of the flange portion 42F in alignment with the threaded holes 80; and a first detection element 86, such as a compression/expansion sensor, is disposed in each recess. The first detection elements 86 detect a stress in the radial direction of the bolt 42 acting between the flange portion 42F and the screws 82, to thereby detect the stress Fxz acting on the thread portion 42B of each bolt 42 perpendicularly to the center axis 42C.

In this fifth embodiment, as in the case of the first detection elements 74 of the above-described fourth embodiment, each first detection element 86 is adjusted, through adjustment of the amounts by which the screws 82 are screwed into the threaded holes 80, such that the detected stress fv at the time when the stress Fxz does not act on the thread portion 42B of the bolt 42 in any direction coincides with a standard detected stress fvo (positive constant). Further, as in the case of the first detection elements 74 of the above-described fourth embodiment, the detected stress fv of each first detection element 86 increases from the standard detected stress fvo in proportion to the stress Fxz when the acting direction of the stress Fxz acting on the thread portion 42B of the bolt 42 perpendicularly to the center axis 42C is outward in the radial direction of the bolt 42 as viewed at the position of a certain first detection element 74; and the detected stress fv of each first detection element 86 decreases from the standard detected stress fvo in proportion to the stress Fxz when the acting direction of the stress Fxz is inward in the radial direction of the bolt 42 as viewed at the position of the certain first detection element 74.

Four second detection elements 76 and one temperature sensor 54 are disposed in a space between the flange portion 42F and the load transmission ring 68. The second detection elements 76 are adapted to detect the stress Fp acting on the thread portion 42B of each bolt 42 along the center axis 42C. The second detection elements 76 and the temperature sensor 54 of this fifth embodiment are also disposed on each bolt at the same circumferential positions as those of the detection elements 46, 76 and the temperature sensor 54 in the above-described first and fourth embodiments.

AS shown in FIG. 18, as in the case of the above-described fourth embodiment, even in a state where the wheel 16 is fixed to the flange portion 28 of the hub member 20 by means of the nut 44 screwed onto the thread portion 42B of the bolt 42 and a predetermined compressive stress acts on the second detection elements 76, the load transmission ring 68 slightly projects from the outboard end of the bolt support portion 64, and comes into contact with the circular plate portion 16A of the wheel 16, to thereby prevent the circular plate portion 16A from coming into direct contact with the outboard end of the bolt support portion 64, and transmit to the second detection elements 76 a stress acting on the wheel 16 along the rotation axis 14.

In this fifth embodiment as well, each second detection element 76 is adjusted such that the detected stress fp at the time when the stress Fp is zero coincides with a standard detected stress fpo (positive constant). Further, when the stress Fp is a tensile stress, the detected stress fp of each second detection element 76 decreases from the standard detected stress fpo in proportion to the stress Fp; and when the stress Fp is a compressive stress, the detected stress fp of each second detection element 76 increases from the standard detected stress fpo in proportion to the stress Fp.

As can be understood from the description above, in this fifth embodiment as well, on the basis of the voltage signals fed from the first detection elements 86 and the second detection elements 76 and the temperature signal fed from the temperature sensor 54, the electronic circuit apparatus 50 calculates the front-rear force Fxt acting at the center P of the ground contact surface of the tire 18 in accordance with the above-described Eqs. 37 to 40 and the above-described Eq. 9, the lateral force Fyt acting at the center P of the ground contact surface of the tire 18 in accordance with the above-described Eqs. 41 to 44 and the above-described Eq. 14, and the vertical force Fzt acting at the center P of the ground contact surface of the tire 18 in accordance with the above-described Eqs. 45 to 48 and the above-described Eq. 19. Notably, the remaining portion of this fifth embodiment is configured in the same manner as in the case of the above-described first embodiment or other embodiments. Further, although the electronic circuit apparatus 50 of the fifth embodiment is disposed within the outboard end portion of the shaft portion 26 of the hub member 20, the electronic circuit apparatus 50 may be fixed to the outer surface of the flange portion 28.

Thus, according to the illustrated fifth embodiment, the stresses Fx1-Fx4 in the rotational direction of the wheel unit 10, the stresses Fy1-Fy4 in the lateral direction of the wheel unit 10, and the stresses Fz1-Fz4 in the vertical direction, which act on each bolt 42 can be obtained on the basis of a change in the surface pressure in the radial direction between the bolt support portion 64 and the flange portion 42F and a change in the surface pressure in the axial direction between the flange portion 42F and the load transmission ring 68, which are caused by an elastic deformation of each bolt 42 stemming from a stress acting from the wheel 16 onto the bolt 42, serving as a connection element. Further, the front-rear force Fxt, the lateral force Fyt, and the vertical force Fzt, which act from the road surface 56 to the tire 18, can be accurately calculated from these stresses as in the case of the above-described first through fourth embodiments.

In particular, according to the fifth embodiment, the stresses Fx1-Fx4 in the rotational direction of the wheel unit 10 and the stresses Fz1-Fz4 in the vertical direction, which act on each bolt 42 are calculated on the basis of the change in the surface pressure in the radial direction between the bolt support portion 64 and the flange portion 42F, which is detected by the first detection elements 86; and the stresses Fy1-Fy4 in the lateral direction of the wheel unit 10 is calculated on the basis of a change in the surface pressure between the flange portion 42F and the load transmission ring 68, which is detected by the second detection elements 76. Therefore, these stresses can be calculated more accurately, as compared with the case of the above-described first through third embodiments, in which all the stresses Fx1-Fx4 in the rotational direction, the stresses Fy1-Fy4 in the lateral direction, and the stresses Fz1-Fz4 in the vertical direction are calculated on the basis of the detection values of the detection elements 46 of a single type.

Further, according to the fifth embodiment, as in the case of the above-described fourth embodiment, each bolt 42 is small in diameter except for the flange portion 42F. Therefore, by means of increasing the ratios of changes in surface pressure in the radial direction and the axial direction to the stresses acting on each bolt 42 to thereby increase the S/N ratio of the stress detection by the first detection elements 86 and the second detection elements 76, the front-rear force Fxt, the lateral force Fyt, and the vertical force Fzt can be calculated more accurately, as compared with the case of the above-described first embodiment.

Further, according to the fifth embodiment, the load transmission ring 68 formed of metal is fitted to the small diameter portion of the bolt 42 located on the side of the flange portion 42F, and the load transmission ring 68 functions as load limiting means for limiting load so as to prevent application of excessive deforming stress on the bolt 42. Therefore, as in the case of the above-described third and fourth embodiments, the application of excessive bending stress on the bolt 42 can be prevented effectively, while the high S/N ratio of the stress detection is secured. Thus, it is possible to effectively prevent the rotation axis 14 of the wheel unit 10 from excessively moving due to force acting on the tire 18.

Further, according to the fifth embodiment, through adjustment of the amounts by which the screws 82 are screwed into the threaded holes 80, the surface pressures acting on the first detection elements 86 in a state where the stress Fxz does not act on the thread portion 42B of the bolt 42 in any direction can be adjusted individually for each detection element. Therefore, the adjustment of the standard detected stress fvo of each first detection element 864 can be performed easily and reliably.

Sixth Embodiment

Figure 20:
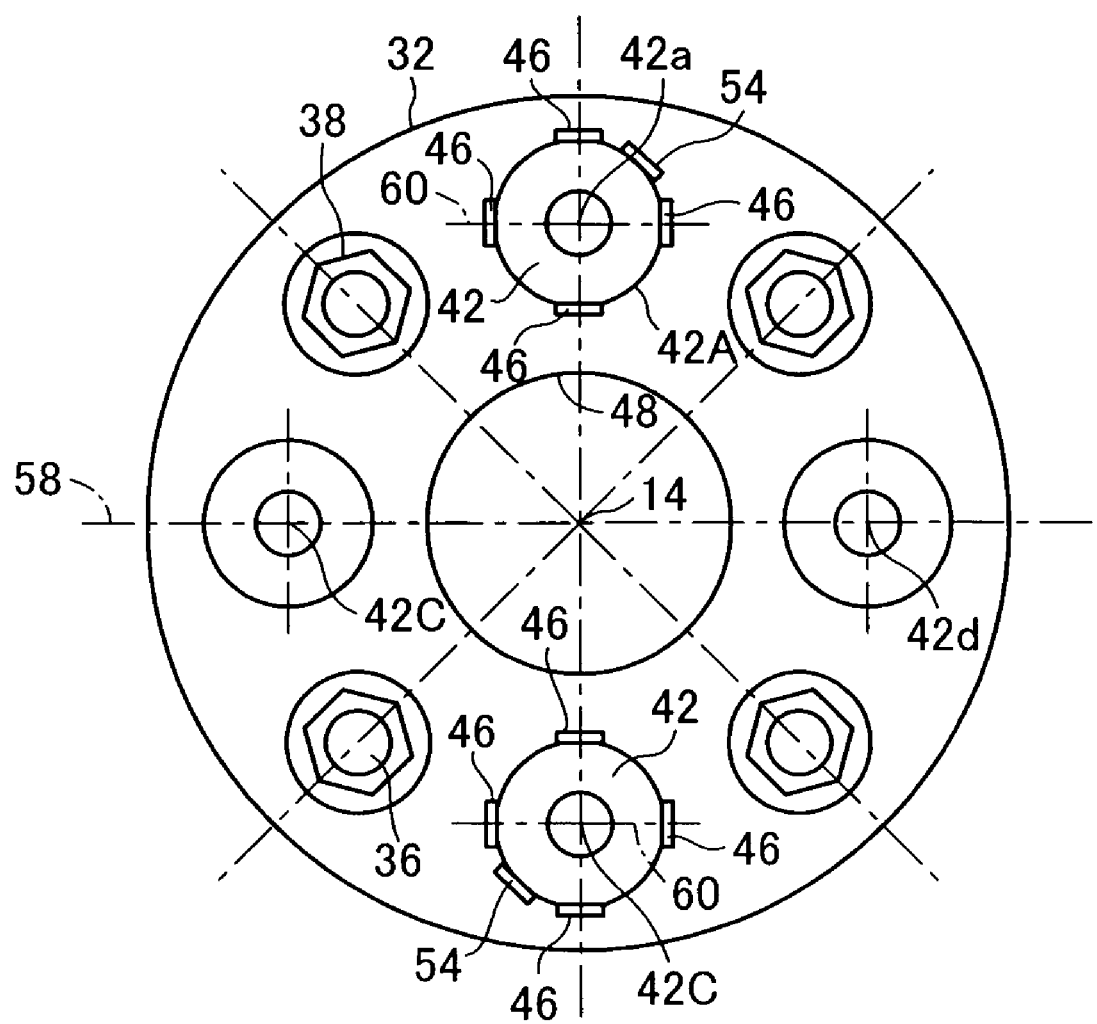
FIG. 20 is a front view of a main portion of a sixth embodiment of the tire-acting-force detection apparatus according to the present invention applied to a drive wheel unit, as viewed from the outboard side of the vehicle.

FIG. 20 is a front view of a main portion of a sixth embodiment of the tire-acting-force detection apparatus according to the present invention applied to a drive wheel unit, as viewed from the outboard side of the vehicle.

In this sixth embodiment, which is a modification of the above-described first embodiment, the disk member 32 is firmly and integrally joined to the flange portion 28 and the brake rotor disk 22 by means of the four bolts 36 and the nuts 38 screw-engaged therewith, and is also integrally connected to the circular plate portion 16A of the wheel 16 by means of the four bolts 42 and the nuts 44 screw-engaged therewith as in the case of the above-described first embodiment. Notably, these points are the same in seventh and eighth embodiments to be described later.

Although each bolt 42 has the same structure as in the above-described first embodiment, the detection elements 46 are provided on only two bolts 42 diametrically separated from each other with respect to the rotation axis 14. Four detection elements 46 and a single temperature sensor 54 are fixed to the cylindrical surface of the root portion 42A of each of these bolts 42. The remaining portion of this embodiment is configured in the same manner as in the above-described first embodiment.

Figure 21:
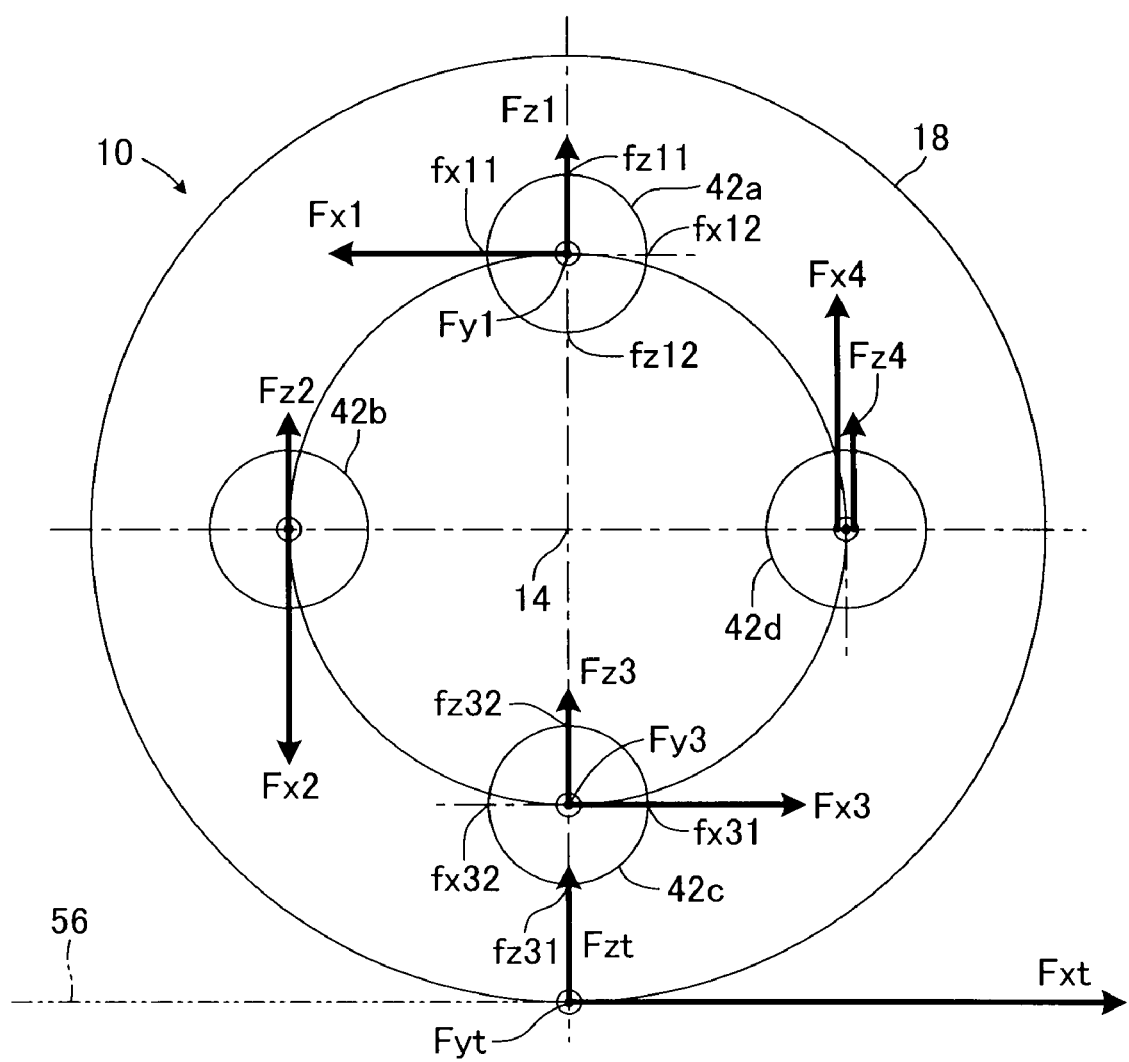
FIG. 21 is an explanatory view showing stresses detected by detection elements in the sixth embodiment, as viewed from the outboard side of the wheel unit.

FIG. 21 is an explanatory view showing stresses detected by the detection elements 46 in the sixth embodiment, as viewed from the outboard side of the wheel unit 10. Here, it is assumed that, as shown in FIG. 21, of the four bolts 42a-42d, the detection elements 46 are provided on the bolts 42a and 42c whose angular interval therebetween around the rotation axis 14 is 180°.

As shown in FIG. 21, on two bolts diametrically separated from each other with respect to the rotation axis 14, a stress in the vertical direction of the wheel unit 10 acts in opposite directions as viewed with respect to the center axis 42 of each bolt. Accordingly, the influence of the stress acting in the vertical direction of the wheel unit 10 can be cancelled out by means of calculating the sum of the stresses Fx1 and Fx3 (in the rotational direction of the wheel unit 10) acting on the two bolts 42a and 42c diametrically separated from each other with respect to the rotation axis 14, and the stresses Fx1 and Fx3 are represented by the above-described Eqs. 5 and 7, respectively.

Therefore, the front-rear force Fxt acting from the road surface 56 to the tire 18 at the center P of the ground contact surface of the tire 18 is represented by the following Eq. 49, where Ax1 is a coefficient (positive constant) determined from the radius of rotation of the wheel unit 10, the distance between the rotation axis 14 and the center axis 42C, etc.

$$Fxt = Ax1(Fx1 + Fx3) \tag{49}$$

As can be understood from the description above, on the basis of the current signals fed from the detection elements 46 and the temperature signal fed from the temperature sensor 54, the electronic circuit apparatus 50 calculates the front-rear force Fxt acting at the center of the ground contact surface of the tire 18 in accordance with the above-described Eqs. 5, 7, and 49. Notably, the front-rear force Fxt may be calculated in accordance with an equation obtained by inserting the above-described Eqs. 5 and 7 into the above-described Eq. 49.

Thus, according to the illustrated sixth embodiment, the stress Fx1 and Fx3 in the rotational direction of the wheel unit 10, which act on two bolts 42 diametrically separated from each other, can be obtained on the basis of a strain of each bolt 42 caused by an elastic deformation thereof stemming from a stress acting from the wheel 16 onto the bolt 42, serving as a connection element. Further, the front-rear force Fxt, which acts from the road surface 56 to the tire 18, can be accurately calculated from these stresses.

Notably, in the illustrated sixth embodiment, four detection elements 46 are provided on each bolt 42. However, the detection elements 46 separated from each other in the radial direction of the wheel unit 10 and located on opposite sides of the center line of the bolt may be omitted.

Seventh Embodiment

Figure 22:
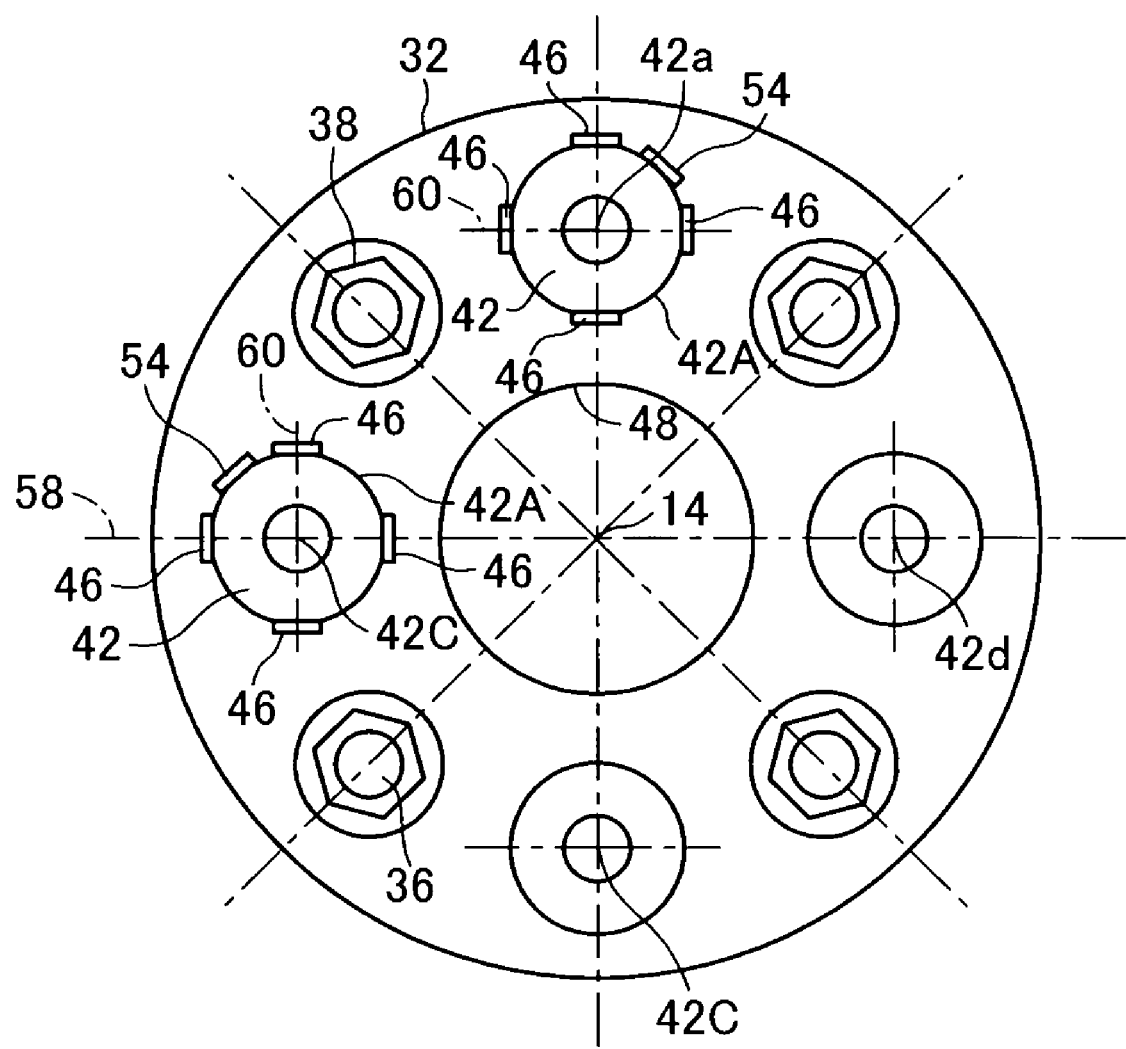
FIG. 22 is a front view of a main portion of a seventh embodiment of the tire-acting-force detection apparatus according to the present invention applied to a drive wheel unit, as viewed from the outboard side of the vehicle.

FIG. 22 is a front view of a main portion of a seventh embodiment of the tire-acting-force detection apparatus according to the present invention applied to a drive wheel unit, as viewed from the outboard side of the vehicle.

In this seventh embodiment, which is a modification of the above-described first embodiment, each bolt 42 has the same structure as in the above-described first embodiment; however, the detection elements 46 are provided on only two bolts 42 which are circumferentially adjacent to each other about the rotation axis 14; i.e., two bolts 42 which are separated 90° from each other about the rotation axis 14. Four detection elements 46 and a single temperature sensor 54 are fixed to the cylindrical surface of the root portion 42A of each of these bolts 42. The remaining portion of this embodiment is configured in the same manner as in the above-described first embodiment.

Figure 23:
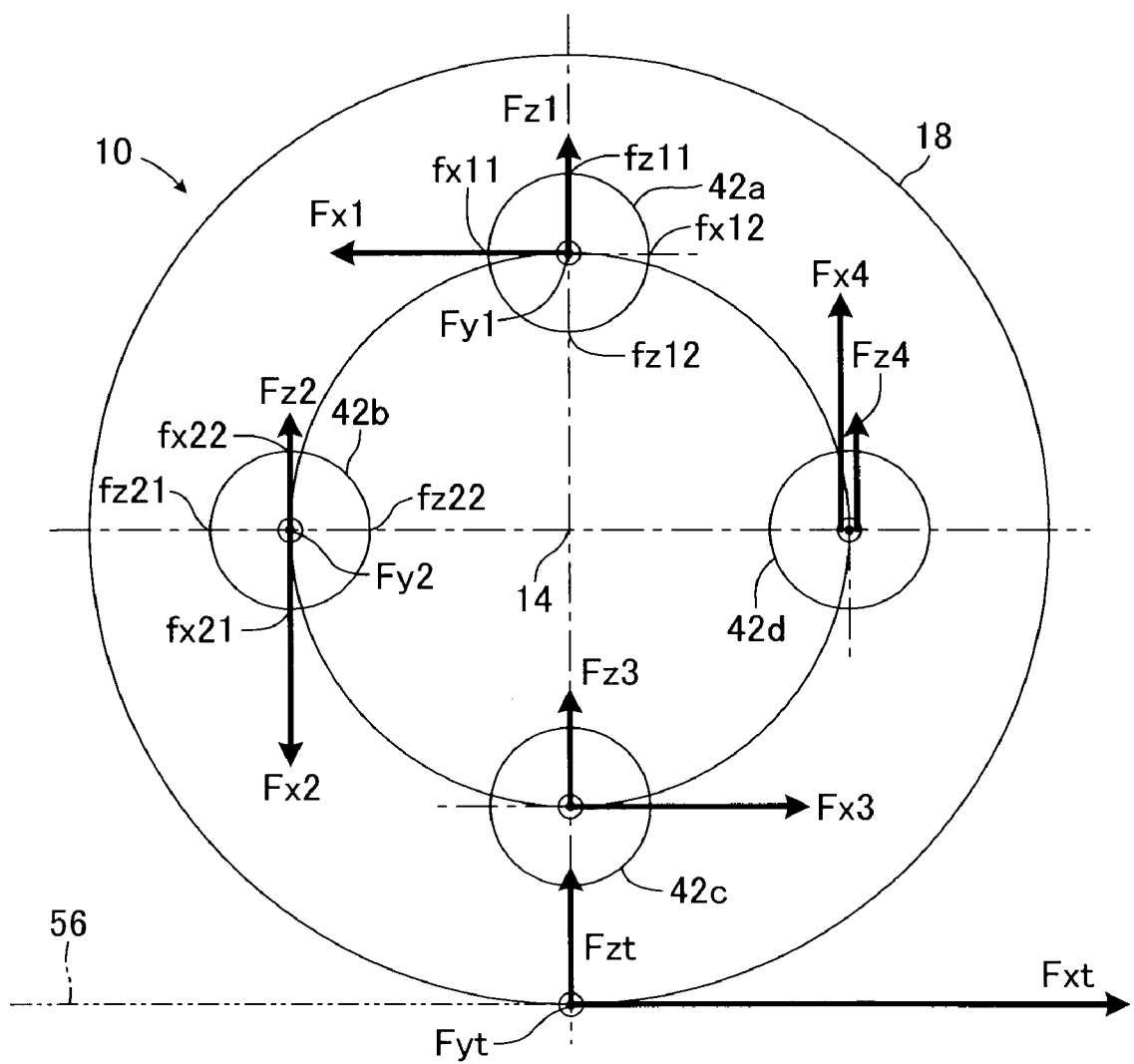
FIG. 23 is an explanatory view showing stresses detected by detection elements in the seventh embodiment, as viewed from the outboard side of the wheel unit.

FIG. 23 is an explanatory view showing stresses detected by the detection elements 46 in the seventh embodiment, as viewed from the outboard side of the wheel unit 10. Here, it is assumed that, as shown in FIG. 23, of the four bolts 42a-42d, the detection elements 46 are provided on the bolts 42a and 42b whose angular interval therebetween around the rotation axis 14 is 90°.

As shown in FIG. 23, the stresses Fz1 and Fz2 acting at the centers of the bolts 42a and 42b in the vertical direction of the wheel unit 10 are represented by the following Eqs. 50 and 51, respectively. Further, the vertical stress acting on the tire 18 is considered to be in proportional to the resultant of the stresses Fz1 and Fz2, and the resultant can be calculated as the square root of sum of squares of the stresses Fz1 and Fz2.

$$Fz1 = f_z11 - f_z12 \tag{50}$$
$$= f_{iz}11 - f_{iz}12$$

$$Fz2 = f_z21 - f_z22 \tag{51}$$
$$= f_{iz}21 - f_{iz}22$$

Therefore, the vertical force Fzt acting from the road surface 56 to the tire 18 at the center P of the ground contact surface of the tire 18 is represented by the following Eq. 52 or 53, where Az2 is a coefficient (positive constant) determined from the distances between the instantaneous center of vertical movement of the wheel unit 10, and the detection elements 46 and the center P of the ground contact surface of the tire 18.

$$Fzt = Az2kz^2\{Fz1^2 + Fz2^2\}^{1/2} \tag{52}$$

$$Fzt = Az2kz^2\{(f_z11 - f_z12)^2 + (f_z21 - f_z22)^2\}^{1/2} \tag{53}$$
$$= Az2kz^2\{(f_{iz}11 - f_{iz}12)^2 + (f_{iz}21 - f_{iz}22)^2\}^{1/2}$$

As can be understood from the description above, on the basis of the current signals fed from the detection elements 46 and the temperature signal fed from the temperature sensor 54, the electronic circuit apparatus 50 calculates the vertical force Fzt acting at the center of the ground contact surface of the tire 18 in accordance with the above-described Eqs. 50 to 52 or the above-described Eq. 53.

Thus, according to the illustrated seventh embodiment, the stresses Fz1 and Fz2 in the radial direction of the wheel unit 10, which act on two bolts 42 located adjacent each other, can be obtained on the basis of a strain of each bolt 42 caused by an elastic deformation thereof stemming from a stress acting from the wheel 16 onto the bolt 42, serving as a connection element. Further, the vertical force Fzt, which acts from the road surface 56 to the tire 18, can be accurately calculated from these stresses.

Notably, in the illustrated seventh embodiment, four detection elements 46 are provided on each bolt 42. However, the detection elements 46 separated from each other in the circumferential direction of the wheel unit 10 and located on opposite sides of the center line of the bolt may be omitted.

Eighth Embodiment

Figure 24:
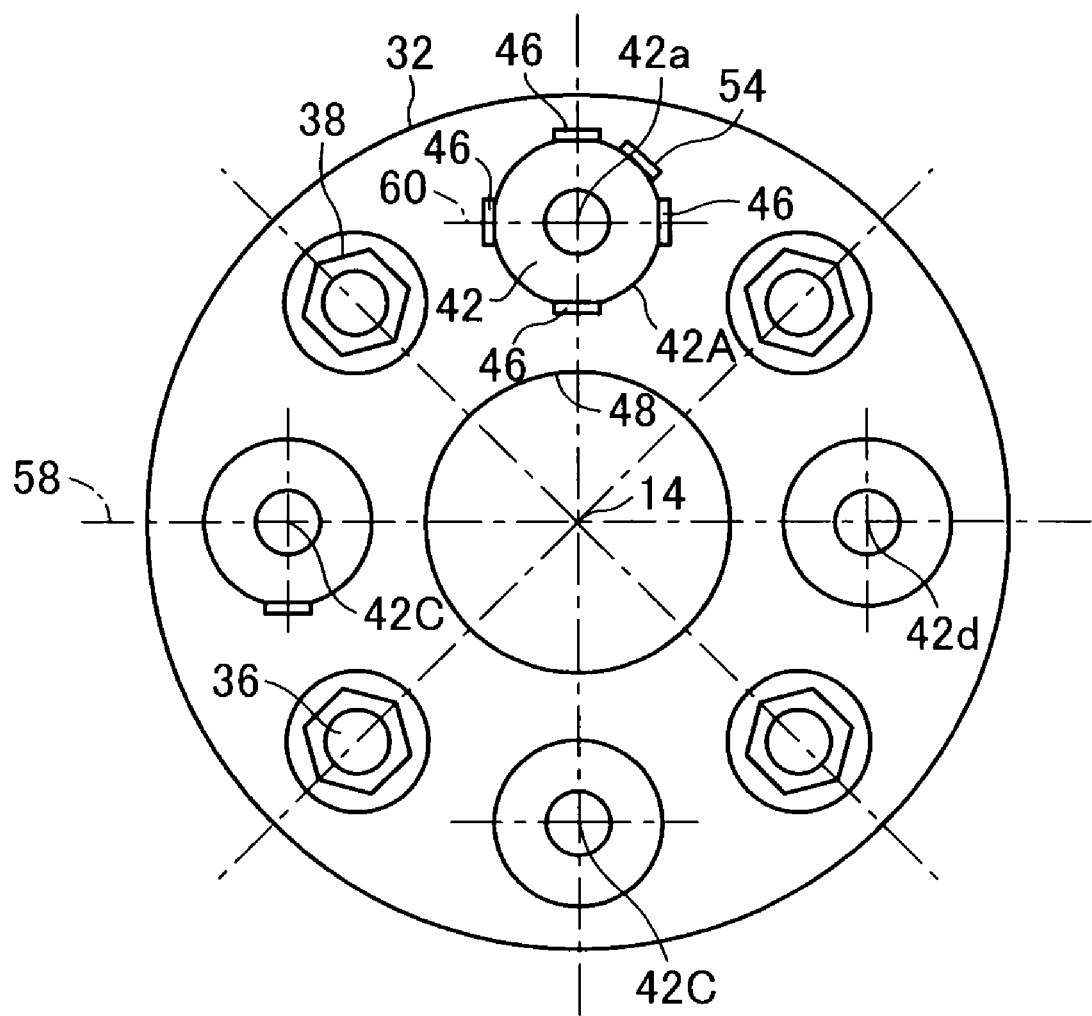
FIG. 24 is a front view of a main portion of an eighth embodiment of the tire-acting-force detection apparatus according to the present invention applied to a drive wheel unit, as viewed from the outboard side of the vehicle.

FIG. 24 is a front view of a main portion of an eighth embodiment of the tire-acting-force detection apparatus according to the present invention applied to a drive wheel unit, as viewed from the outboard side of the vehicle.

In this eighth embodiment, which is a modification of the above-described first embodiment, each bolt 42 has the same structure as in the above-described first embodiment; however, the detection elements 46 are provided on only one bolt 42. Four detection elements 46 and a single temperature sensor 54 are fixed to the cylindrical surface of the root portion 42A of the bolt 42. The remaining portion of this embodiment is configured in the same manner as in the above-described first embodiment.

Figure 25:
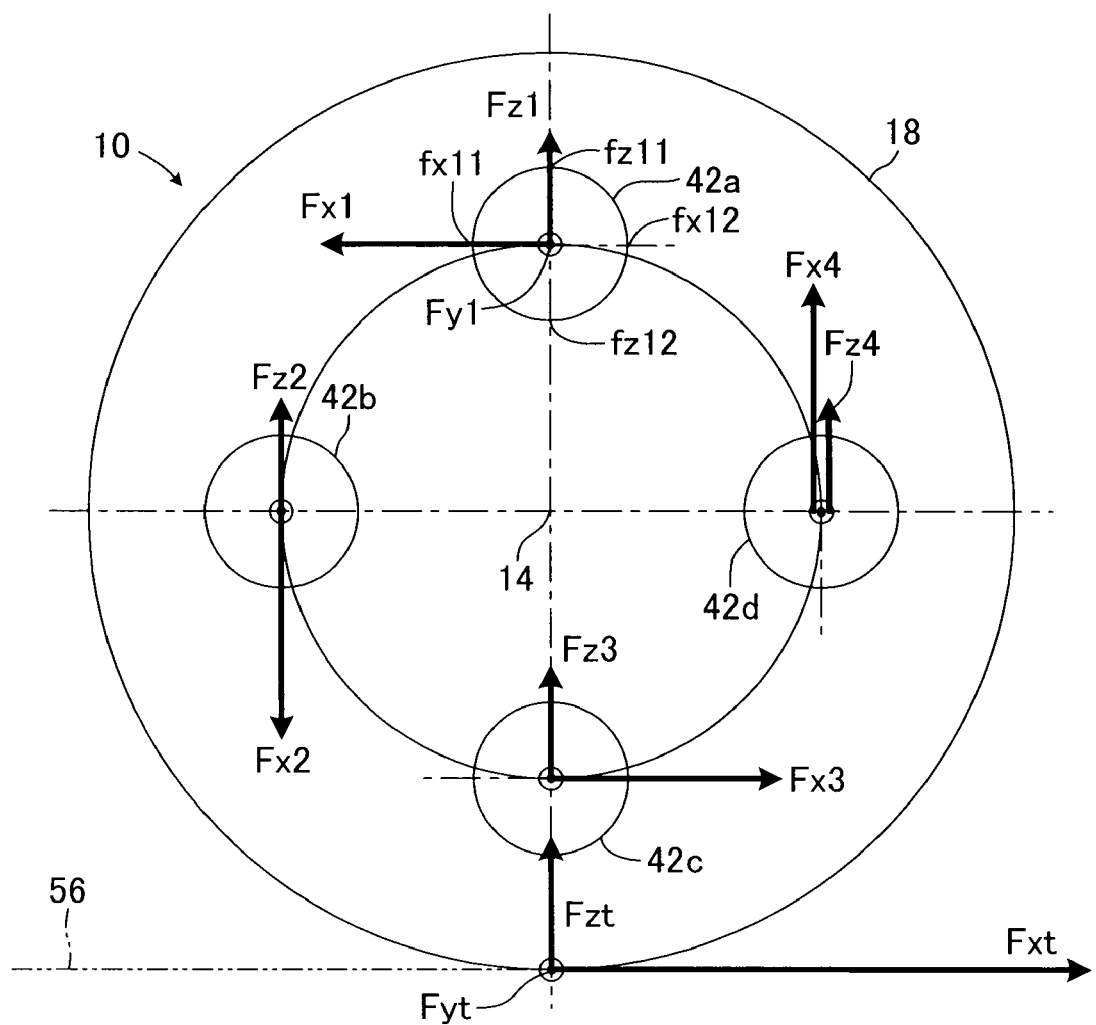
FIG. 25 is an explanatory view showing stresses detected by detection elements in the eighth embodiment, as viewed from the outboard side of the wheel unit.

FIG. 25 is an explanatory view showing stresses detected by the detection elements 46 in the eighth embodiment, as viewed from the outboard side of the wheel unit 10. Here, it is assumed that, as shown in FIG. 25, of the four bolts 42a-42d, only the bolt 42a has the detection elements 46 provided thereon.

As shown in FIG. 25, the stress Fx1 acting at the center of the bolt 42a in the circumferential direction of the wheel unit 10 is represented by the following Eq. 54, and the stress Fz1 acting at the center of the bolt 42a in the radial direction of the wheel unit 10 is represented by the following Eq. 55.

$$Fx1 = fx11 - fx12 \\ = kx(fix11 - fix12) \quad (54)$$

$$Fz1 = fz11 - fz12 \\ = kz(fiz11 - fiz12) \quad (55)$$

Figure 26:
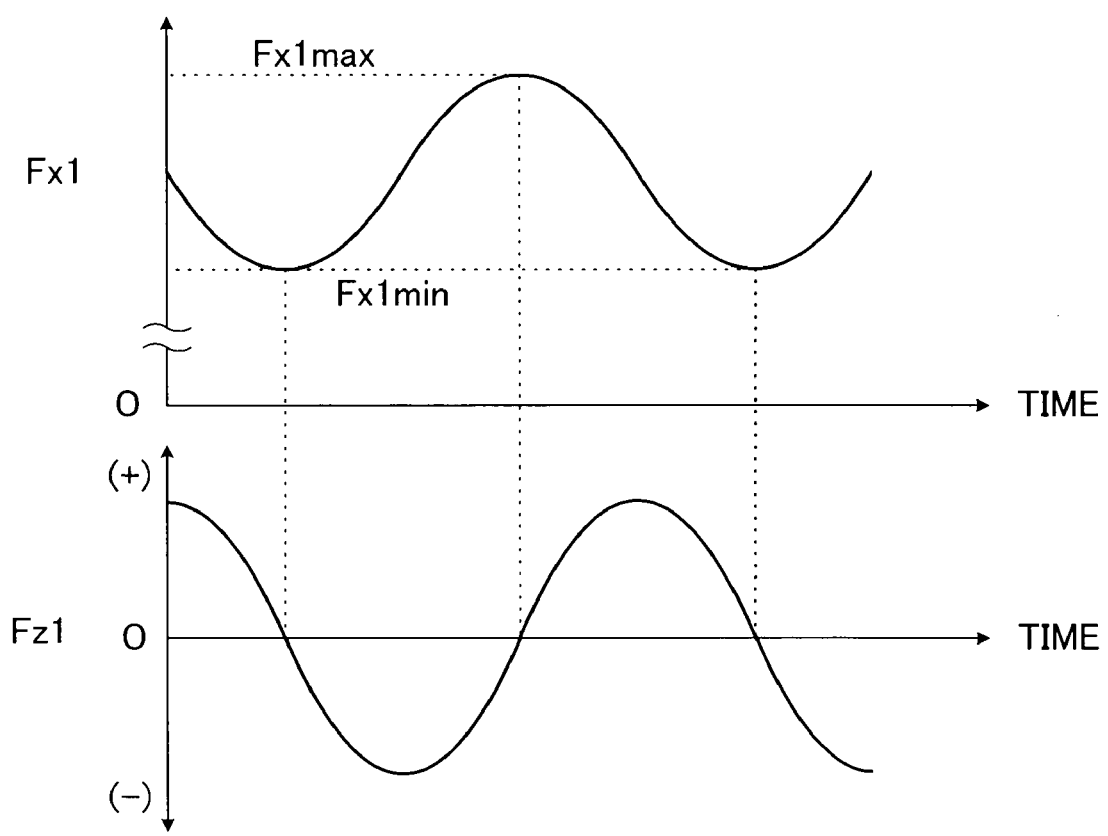
FIG. 26 is a graph showing changes in stress Fx1 in the circumferential direction of the wheel unit and stress Fz1 in the radial direction of the wheel unit, the stresses acting at the center of a bolt.

FIG. 26 is a graph showing changes in the stresses Fx1 and Fz1. As shown in FIG. 26, the value of the stress Fz1 changes sinusoidally such that the stress Fz1 becomes zero when the bolt 42a is located at the positions of the bolts 42b and 42d in FIG. 25; assumes the maximum value when the bolt 42a is located at the position of the bolt 42a in FIG. 25; and assumes the minimum value when the bolt 42a is located at the position of the bolt 42c in FIG. 25. In contrast, the value of the stress Fx1 changes sinusoidally such that the stress Fx1 assumes the minimum value Fx1min when the stress Fz1 becomes zero in the course of changing from the maximum value to the minimum value, and the stress Fx1 assumes the maximum value Fx1max when the stress Fz1 becomes zero in the course of changing from the minimum value to the maximum value.

Accordingly, the value of the stress Fx1 at the time when the polarity of the stress Fz1 changes from negative to positive can be used as the maximum value Fx1max of the stress Fx1; and the value of the stress Fx1 at the time when the polarity of the stress Fz1 changes from positive to negative can be used as the minimum value Fx1min of the stress Fx1.

Further, the stress Fx acting at the center of the bolt in the rotational direction of the wheel unit 10 is the average of the maximum value Fx1 max and the minimum value Fx1min, and the front-rear force Fxt acting from the road surface 56 to the tire 18 at the center P of the ground contact surface of the tire 18 is considered to be in proportion to the stress Fx. In contrast, the stress Fz acting at the center of the bolt in the vertical direction of the wheel unit 10 is the difference between the maximum value Fx1 max and the minimum value Fx1min, and the vertical force Fzt acting from the road surface 56 to the tire 18 at the center P of the ground contact surface of the tire 18 is considered to be in proportion to the stress Fz.

Therefore, the front-rear force Fxt and the vertical force Fzt acting from the road surface 56 to the tire 18 at the center P of the ground contact surface of the tire 18 are represented by the following Eqs. 56 and 57, respectively, where Ax3 is a coefficient (positive constant) determined from the radius of rotation of the wheel unit 10, the distance between the rotation axis 14 and the center axis 42C, etc., and Az3 is a coefficient (positive constant) determined from the distances between the instantaneous center of vertical movement of the wheel unit 10, and the detection elements 46 and the center P of the ground contact surface of the tire 18.

$$Fxt = Ax3(Fx1\max + Fx1\min) \quad (56)$$

$$Fzt = Az3(Fx1\max - Fx1\min) \quad (57)$$

Figure 27:
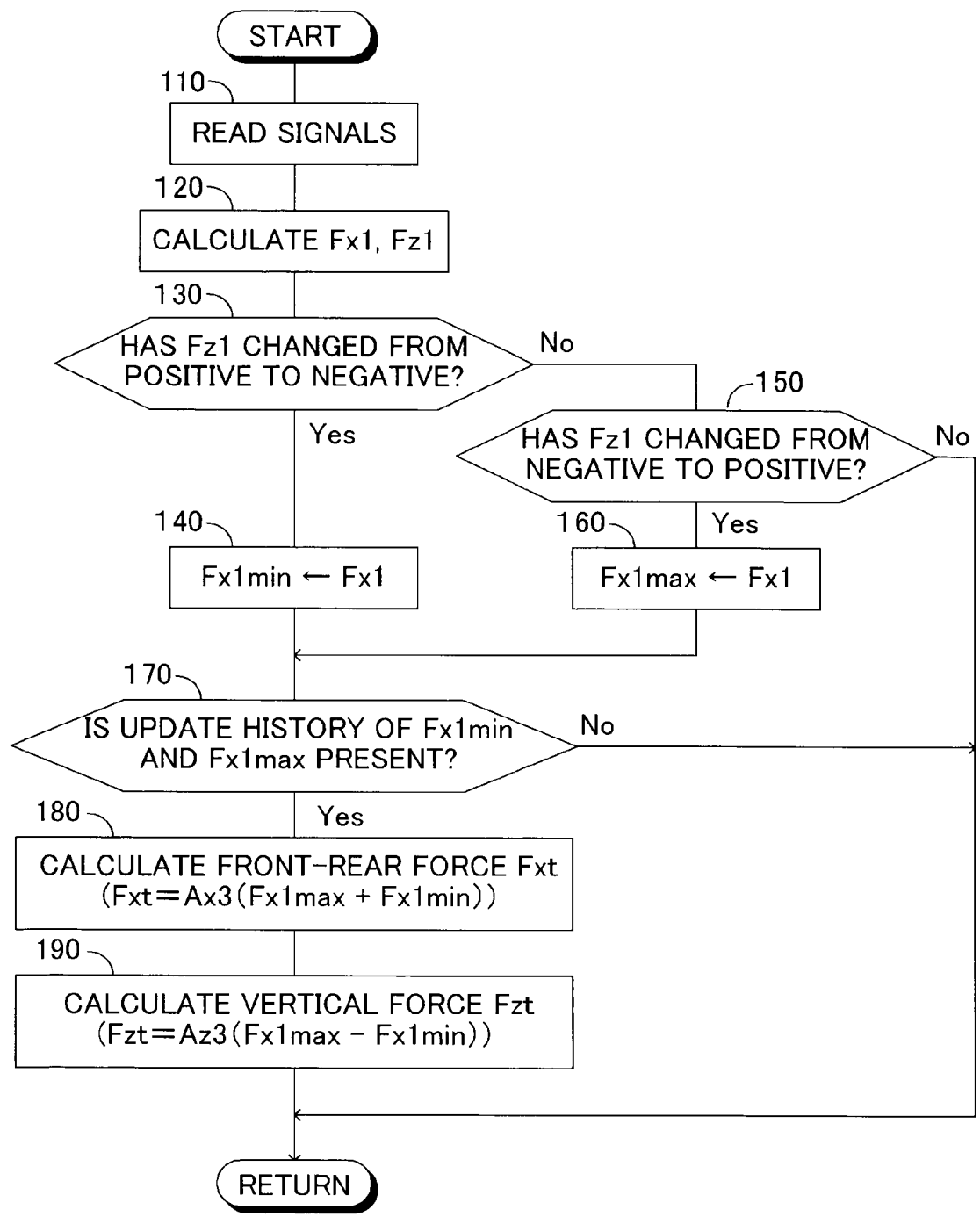
FIG. 27 is a flowchart showing a routing for calculating front-rear force Fxt and vertical force Fzt in the eighth embodiment.

Next, a routine for calculating the front-rear force Fxt and the vertical force Fzt in the eighth embodiment will be described with reference to a flowchart shown in FIG. 27. Calculation control in accordance with the flowchart shown in FIG. 27 is started when the unillustrated ignition switch is closed, and executed by the electronic circuit apparatus 50 at predetermined intervals.

First, in step 110, the electronic circuit apparatus 50 reads signals fed from the detection elements 46 and representing their output currents, and a signal representing the vehicle speed V, etc. In step 120, the electronic circuit apparatus 50 calculates the stresses Fx1 and Fz1 in accordance with the above-described Eqs. 37 and 50.

In step 130, the electronic circuit apparatus 50 determines whether or not the polarity of the stress Fz1 has changed from positive to negative. When the electronic circuit apparatus 50 makes a "No" determination, it proceeds to step 150. When the electronic circuit apparatus 50 makes a "Yes" determination, it proceeds to step 140, and stores the stress Fx1 at that time as the minimum value Fx1min. Subsequently, the electronic circuit apparatus 50 proceeds to step 170.

In step 150, the electronic circuit apparatus 50 determines whether or not the polarity of the stress Fz1 has changed from negative to positive. When the electronic circuit apparatus 50 makes a "No" determination, it ends the current execution of the present control in accordance with the flowchart shown in FIG. 27. When the electronic circuit apparatus 50 makes a "Yes" determination, it proceeds to step 160, and stores the stress Fx1 at that time as the maximum value Fx1 max. Subsequently, the electronic circuit apparatus 50 proceeds to step 170.

In step 170, the electronic circuit apparatus 50 determines whether or not there is a history indicating that the minimum value Fx1min and the maximum value Fx1 max have been updated after the control in accordance with the flowchart shown in FIG. 27 had been started; i.e., whether or not the minimum value Fx1min and the maximum value Fx1 max have been updated. When the electronic circuit apparatus 50 makes a "No" determination, it ends the current execution of the present control in accordance with the flowchart shown in FIG. 27. When the electronic circuit apparatus 50 makes a "Yes" determination, it proceeds to step 180.

In step 180, the electronic circuit apparatus 50 calculates the front-rear force Fxt acting from the road surface 56 to the tire 18 at the center P of the ground contact surface of the tire 18 in accordance with the above-described Eq. 56. In step 190, the electronic circuit apparatus 50 calculates the vertical force Fzt acting from the road surface 56 to the tire 18 at the center P of the ground contact surface of the tire 18 in accordance with the above-described Eq. 57.

Thus, according to the illustrated eighth embodiment, the stress Fx1 in the circumferential direction of the wheel unit 10 and the stress Fz1 in the radial direction of the wheel unit 10, which act on one bolt 42 can be obtained on the basis of a strain of the bolt 42 caused by an elastic deformation thereof stemming from a stress acting from the wheel 16 onto the bolt 42, serving as a connection element. Further, by making use of the fact that a constant phase relation is present between the periodic changes of the stresses Fx1 and Fz1, the front-rear force Fzt and the vertical force Fzt, which act from the road surface 56 to the tire 18, can be accurately calculated on the basis of the stresses Fx1 and Fz1.

Further, according to the above-described eighth embodiment, since the front-rear force Fxt and the vertical force Fzt are calculated one time every time the wheel unit 10 rotates 180 degrees. Therefore, smoothing processing may be performed on the calculated values; for example, the average of the value in the previous cycle and the value in the present cycle or the moving average of the values in past few cycles and the value in the present cycle, may be calculated.

Further, in the above-described eighth embodiment, the detection elements 46 are provided on only one bolt 42. However, the eighth embodiment may be modified in such a manner that the detection elements 46 are provided on two bolts 42 diametrically separated from each other with respect to the rotation axis 14 as in the above-described sixth embodiment, and the front-rear force Fxt and the vertical force Fzt are calculated one time every time the wheel unit 10 rotates 90 degrees. Alternatively, the eighth embodiment may be modified in such a manner that the detection elements 46 are provided on the four bolts 42, and the front-rear force Fxt and the vertical force Fzt are calculated one time every time the wheel unit 10 rotates 45 degrees.

Further, in the above-described eighth embodiment, both the front-rear force Fxt and the vertical force Fzt are calculated. However, the eighth embodiment may be modified to calculate only one of the front-rear force Fxt and the vertical force Fzt in accordance with the above-described Eq. 56 or 57.

As can be understood from the description above, in each of the above-described embodiments, the temperature T1, etc. of each bolt 42 or each bolt support portion 64 is detected by the temperature sensor 54, and the detected stresses fix*1, etc. are corrected on the basis of the temperature T1, etc., whereby the temperature-compensated stresses fx*1, etc. are calculated. As compared with the case where correction based on the temperature is not performed or the case where correction is performed on the basis of the ambient temperature or one temperature of the disk member 32 or the flange portion 28, the front-rear force Fxt, the lateral force Fyt, and the vertical force Fzt, which act from the road surface 56 to the tire 18, can be accurately calculated, irrespective of the temperature of each bolt 42 or each bolt support portion 64.

Further, in the above-described first through fifth embodiments, the vertical stress Fz1-Fz4 acting on each bolt is calculated in accordance with the above-described Eqs. 15 to 18, etc. as the resultant of the stress Fzz in the radial direction and the stress Fxx in the rotational direction from which rotational torque has been eliminated. Therefore, as compared with the case where rotational torque is not eliminated, the vertical stresses Fz1-Fz4 can be accurately calculated, whereby the vertical force Fzt acting from the road surface 56 to the tire 18 can be accurately calculated.

Further, in the above-described second and fifth embodiments, the disk member 32 is not required. Therefore, as compared with the above-described first, third, fourth, and sixth to eighth embodiments, the number of components of the tire-acting-force detection apparatus 12 can be reduced, whereby cost can be reduced. In addition, mounting of the tire-acting-force detection apparatus 12 on the vehicle can be performed efficiently. In contrast, in the above-described first, third, fourth, and sixth to eighth embodiments, the disk member 32, which constitutes at least a portion of the tire-acting-force detection apparatus 12, is fixed to the flange portion 28 of the hub member 20, and the wheel unit 10 is fixedly connected to the disk member 32. Therefore, as compared with the above-described second and fifth embodiments, the structure alteration request to the existing hub member can be minimized.

Further, in the above-described third through fifth embodiments, the detection elements 74, 76, 86 are disposed within a space isolated from the atmosphere. Therefore, as compared with the above-described first and second embodiments and sixth through eighth embodiments, it is possible to reduce stress detection errors and prevent possible failure of the tire-acting-force detection apparatus 12, which errors and failure would otherwise occur when dust or muddy water reaches the detection elements.

The present invention has been described with reference to specific embodiments. However, it is apparent to those skilled in the art that the present invention is not limited to the above-described embodiments, and various other embodiments may be possible within the scope of the present invention.

For example, in the above-described first through fifth embodiments, the front-rear force Fxt acting from the road surface 56 to the tire 18 at the center P of the ground contact surface of the tire 18 is calculated on the basis of the stress Fx1-Fx4 acting at the center of each bolt in the rotational direction of the wheel unit 10; the lateral force Fyt acting from the road surface 56 to the tire 18 at the center P of the ground contact surface of the tire 18 is calculated on the basis of the stress Fy1-Fy4 acting at the center of each bolt along the center axis 42C; and the vertical force Fzt acting from the road surface 56 to the tire 18 at the center P of the ground contact surface of the tire 18 is calculated on the basis of the stress Fz1-Fz4 acting at the center of each bolt in the vertical direction. However, calculation of any one of the front-rear force Fxt, the lateral force Fyt, and the vertical force Fzt may be omitted.

Further, in the above-described first through fifth embodiments, the electronic circuit apparatus 50 calculates the stresses Fx1-Fx4, Fy1-Fy4, and Fz1-Fz4, and further calculates the front-rear force Fxt, the lateral force Fyt, and the vertical force Fzt. However, the embodiments may be modified such that the calculation means is a control apparatus mounted on the vehicle body, such as a vehicle motion controller; the current signal fed from each detection element 46 and the temperature signal fed from the temperature sensor 54, or signals representing the stresses Fx1-Fx4, Fy1-Fy4, and Fz1-Fz4 are supplied to the control apparatus mounted on the vehicle body; and the control apparatus mounted on the vehicle body calculates the stresses Fx1-Fx4, Fy1-Fy4, Fz1-Fz4, or the front-rear force Fxt, the lateral force Fyt, and the vertical force Fzt.

Further, in the above-described sixth through eighth embodiments, the stress detection means for detecting stresses acting on each bolt has the same configuration as the stress detection means in the first embodiment. However, stress detection means which has the same configuration as the stress detection means in any of the second through fifth embodiments may be applied to the sixth through eighth embodiments.

Further, in the above-described embodiments, the temperature sensor 54 is provided on each bolt, and correction of the detected stress based on the temperature characteristic of the detection elements is performed for each bolt. However, the embodiments may be modified in such a manner that a single temperature sensor is provided on each wheel unit, and, for all the bolts of the wheel unit, correction of the detected stress based on the temperature characteristic of the detection elements is performed on the basis of the temperature detected by the single temperature sensor. Further, in the case where a change in the detection value of each detection element with temperature is small, the correction of the detected stress based on the temperature may be omitted.

Further, in the above-described embodiments, four bolts are provided as connection elements of the connection means. However, the tire-acting-force detection apparatus of the present invention may be applied to wheel units in which a plurality of (other than four); e.g., five, six, or eight connection means are disposed such that they are separated from one another around the rotation axis thereof. In particular, when the sixth embodiment is applied to a wheel unit in which a plurality of (other than four) connection means are disposed, the stress detection means may be provided on arbitrary two connection means whose angular interval therebetween around the rotation axis of the wheel unit is closest to 180°. Further, when the seventh embodiment is applied to a wheel unit in which a plurality of (other than four) connection means are disposed, the stress detection means may be provided on arbitrary two connection means whose angular interval therebetween around the rotation axis of the wheel unit is closest to 90°.

Further, in the above-described embodiments, the connection means is a tightening-type connection means composed of a bolt and a nut. However, the connection means may be composed of any combination of two members, other than a bolt and a nut, such as a combination of a rod-like member which extends parallel to the rotation axis of the wheel unit like a bolt, and a cap member which is fixed to the distal end of the rod-like member by fixing means such a vis, a slit pin, or a rotation lock, so long as the connection means can connect the circular plate portion of the wheel and the wheel support portion of the wheel support member; preferably, so long as the connection means can connect the circular plate portion of the wheel and the wheel support portion of the wheel support member in a removable manner.

The invention claimed is:

1. A tire-acting-force detection apparatus for a vehicle which includes a wheel unit composed of a wheel having a circular plate portion perpendicular to a rotation axis and a tire held at an outer circumferential portion of the wheel; a wheel support member which is supported by a vehicle body for rotation about the rotation axis and which supports the wheel for rotation about the rotation axis by a wheel support portion thereof extending perpendicularly to the rotation axis; and at least one connection means for connecting the circular plate portion of the wheel and the wheel support portion of the wheel support member, the tire-acting-force detection apparatus being adapted to estimate a tire acting force, which is a force acting at a ground contact point of the tire, and comprising:

at least one stress detection means for detecting a stress acting on the at least one connection means, the stress detection means disposed at the connection means; and calculation means for calculating the tire acting force on the basis of a detected stress.

2. A tire-acting-force detection apparatus according to claim 1, wherein the connection means has a center axis parallel to the rotation axis; and the stress detection means detects a stress acting on the connection means at a plurality of positions about the center axis.

3. A tire-acting-force detection apparatus according to claim 2, wherein the stress detection means detects, at a plurality of positions about the center axis of the connection means, a stress in a direction parallel to the center axis.

4. A tire-acting-force detection apparatus according to claim 2, wherein the stress detection means detects, at a plurality of positions about the center axis of the connection means, a stress in a direction passing through the center axis and perpendicular to the center axis.

5. A tire-acting-force detection apparatus according to claim 1, wherein a plurality of connection means are disposed around the rotation axis separated from one another, and wherein the stress detection means detects a stress acting on each of the plurality of connection means.

6. A tire-acting-force detection apparatus according to claim 5, wherein the calculation means calculates at least one of a stress acting in a front-rear direction of the tire at the ground contact point of the tire, a stress acting in a lateral direction of the tire at the ground contact point of the tire, and a stress acting in a vertical direction of the tire at the ground contact point of the tire, on a basis of at least one of a stress acting in a rotational direction of the wheel unit at a position of a center axis of each connection means, a stress acting in a lateral direction of the wheel unit at the position of the center axis of each connection means, and a stress acting in a vertical direction of the wheel unit at the position of the center axis of each connection means, the stresses being presumed to act at the position of the center axis of each connection means on a basis of stresses at a plurality of positions about the center axis.

7. A tire-acting-force detection apparatus according to claim 1, wherein a plurality of connection means are disposed around the rotation axis separated from one another, and wherein the stress detection means detects stresses acting on two connection means whose angular interval therebetween about the rotation axis is closest to 180°.

8. A tire-acting-force detection apparatus according to claim 7, wherein the calculation means calculates a stress acting in a front-rear direction of the tire at the ground contact point of the tire on a basis of stresses which are presumed, on a basis of stresses at a plurality of positions about a center axis of each connection means, to act in a rotational direction of the wheel unit at the positions of the center axes of the two connection means.

9. A tire-acting-force detection apparatus according to claim 1, wherein a plurality of connection means are disposed around the rotation axis separated from one another, and wherein the stress detection means detects stresses acting on two connection means whose angular interval therebetween about the rotation axis is closest to 90°.

10. A tire-acting-force detection apparatus according to claim 9, wherein the calculation means calculates a stress acting in a vertical direction of the tire at the ground contact point of the tire on a basis of stresses which are presumed, on a basis of stresses at a plurality of positions about a center axis of each of two connection means, to act in a vertical direction of the wheel unit at the positions of the center axes of the two connection means.

11. A tire-acting-force detection apparatus according to claim 1, wherein a plurality of connection means are disposed around the rotation axis separated from one another, and
wherein the stress detection means detects stresses acting on one connection means.

12. A tire-acting-force detection apparatus according to claim 11, wherein the calculation means calculates a stress acting in a front-rear direction of the tire at the ground contact point of the tire or a stress acting in a vertical direction of the tire at the ground contact point of the tire, on a basis of a stress acting in a rotational direction of the wheel unit at a position of a center axis of the one connection means and a stress acting in a vertical direction of the wheel unit at the position of the center axis of the one connection means, the stresses being presumed to act at the position of the center axis of the one connection means on a basis of stresses at a plurality of positions about the center axis.

13. A tire-acting-force detection apparatus according to claim 1, further comprising a disk member which is interposed between the circular plate portion of the wheel and the wheel support member and functions as the wheel support portion,
wherein the disk member is fixed to the wheel support member and is connected to the circular plate portion of the wheel by a plurality of connection means.

14. A tire-acting-force detection apparatus according to claim 1, wherein the connection means includes a holding portion provided on the wheel support portion, and
a connection element that is cantilevered at a first end portion by the holding portion, is fixedly connected at a second end portion to the circular plate portion, and extends parallel to the rotation axis, and
wherein the stress detection means includes strain detection means for detecting a strain of the connection element caused by an elastic deformation thereof.

15. A tire-acting-force detection apparatus according to claim 1, wherein the connection means includes
a holding portion provided on the wheel support portion, and
a connection element that is cantilevered at a first end portion by the holding portion, is fixedly connected at a second end portion to the circular plate portion, and extends parallel to the rotation axis, and
wherein the stress detection means includes strain detection means for detecting a strain of the holding portion caused by an elastic deformation thereof.

16. A tire-acting-force detection apparatus according to claim 1, wherein the connection means includes
a holding portion provided on the wheel support portion, and
a connection element that is cantilevered at a first end portion by the holding portion, is fixedly connected at a second end portion to the circular plate portion, and extends parallel to the rotation axis, and
wherein the stress detection means includes displacement amount detection means for detecting an amount of relative displacement of the connection element in relation to the holding portion caused by an elastic deformation of the connection element.

17. A tire-acting-force detection apparatus according to claim 1, wherein the connection means includes
a holding portion provided on the wheel support portion, and
a connection element that is cantilevered at a first end portion by the holding portion, is fixedly connected at a second end portion to the circular plate portion, and extends parallel to the rotation axis, and
wherein the stress detection means includes surface pressure detection means for detecting a surface pressure between the connection element and the wheel support portion.

18. A tire-acting-force detection apparatus according to claim 17, wherein the surface pressure detection means detects a surface pressure in a direction perpendicular to a center axis between the connection element and the wheel support portion.

19. A tire-acting-force detection apparatus according to claim 17, wherein the surface pressure detection means includes
a detection element disposed between the connection element and the wheel support portion, and
adjustment means for adjusting a surface pressure which acts on the detection element in a state where no extra stress acts on the tire by adjusting a clearance between the connection element and the wheel support portion in a direction perpendicular to the center axis.

20. A tire-acting-force detection apparatus according to claim 17, wherein the surface pressure detection means detects a surface pressure in a direction along a center axis between the connection element and the circular plate portion of the wheel.

21. A tire-acting-force detection apparatus according to claim 20, further comprising a detection element disposed between the connection element and the circular plate portion of the wheel; and
a stress transfer means which is disposed between the connection element and the circular plate portion, is fitted onto the connection element, and transfers stress from the circular plate portion to the detection element along the center axis.

22. A tire-acting-force detection apparatus according to claim 14, wherein the first end portion of the connection element has a larger cross sectional area than that of the second end portion of the connection element.

23. A tire-acting-force detection apparatus according to claim 14, wherein the wheel support portion includes load limiting means fitted onto the connection element at a position separated from one end portion thereof toward a wheel unit side along a center axis, and limits elastic deformation of the connection element to thereby limit load acting on the connection element.

24. A tire-acting-force detection apparatus according to claim 23, wherein the load limiting means is a portion of the wheel support portion.

25. A tire-acting-force detection apparatus according to claim 24, wherein an elastic seal ring annularly extending around the center axis is disposed between the connection element and a portion of the wheel support portion, wherein the elastic seal ring prevents a foreign substance from reaching the stress detection means.

26. A tire-acting-force detection apparatus according to claim 23, wherein the load limiting means extends annularly around the connection element between the connection element and the wheel support portion, and wherein first and second elastic seal rings each annularly extending around the center axis are disposed between the connection element and the load limiting means and between the load limiting means and the wheel support portion, respectively, wherein the first and second elastic seal rings prevent a foreign substance from reaching the stress detection means.

27. A tire-acting-force detection apparatus according to claim 14, wherein at least a portion of the connection element is a tubular shape, and wherein the stress detection means detects a strain of the tubular-shaped portion of the connection element.

28. A tire-acting-force detection apparatus according to claim 15, wherein at least a portion of the holding portion is a tubular shape, and wherein the stress detection means detects a strain of the tubular-shaped portion of the holding portion.

* * * * *